(12) United States Patent
Lee et al.

(10) Patent No.: US 11,412,225 B2
(45) Date of Patent: Aug. 9, 2022

(54) METHOD AND APPARATUS FOR IMAGE PROCESSING USING CONTEXT-ADAPTIVE ENTROPY MODEL

(71) Applicant: Electronics and Telecommunications Research Institute, Daejeon (KR)

(72) Inventors: Joo-Young Lee, Daejeon (KR); Seung-Hyun Cho, Daejeon (KR); Seung-Kwon Beack, Daejeon (KR); Hyunsuk Ko, Daejeon (KR); Youn-Hee Kim, Daejeon (KR); Jong-Ho Kim, Daejeon (KR); Jin-Wuk Seok, Daejeon (KR); Woong Lim, Daejeon (KR); Se-Yoon Jeong, Daejeon (KR); Hui-Yong Kim, Daejeon (KR); Jin-Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 125 days.

(21) Appl. No.: 16/585,658

(22) Filed: Sep. 27, 2019

(65) Prior Publication Data
US 2020/0107023 A1    Apr. 2, 2020

(30) Foreign Application Priority Data

Sep. 27, 2018  (KR) .......................... 10-2018-0114613
Sep. 25, 2019  (KR) .......................... 10-2019-0118058

(51) Int. Cl.
*H04N 19/13*      (2014.01)
*H04N 19/184*    (2014.01)
*H04N 19/196*    (2014.01)
*H04N 19/149*    (2014.01)

(52) U.S. Cl.
CPC ........... *H04N 19/13* (2014.11); *H04N 19/149* (2014.11); *H04N 19/184* (2014.11); *H04N 19/196* (2014.11)

(58) Field of Classification Search
CPC ..... H04N 19/13; H04N 19/149; H04N 19/184
See application file for complete search history.

(56) References Cited

U.S. PATENT DOCUMENTS 5,903,676 A    5/1999   Wu et al.
8,620,091 B2   12/2013  Choi
(Continued)

OTHER PUBLICATIONS

"Context-adaptive Entropy Model for End-to-end Optimized Image Compression", Sep. 27, 2018, pp. 1-19, conference paper at ICLR 2019.

*Primary Examiner* — Jeremiah C Hallenbeck-Huber
(74) *Attorney, Agent, or Firm* — William Park & Associates Ltd.

(57) ABSTRACT

Disclosed herein is a context-adaptive entropy model for end-to-end optimized image compression. The entropy model exploits two types of contexts. The two types of contexts are a bit-consuming context and a bit-free context, respectively, and these contexts are classified depending on the corresponding context requires the allocation of additional bits. Based on these contexts, the entropy model may more accurately estimate the distribution of each latent representation using a more generalized form of entropy models, thus improving compression performance.

18 Claims, 15 Drawing Sheets

(56) References Cited

U.S. PATENT DOCUMENTS

| | | | |
|---|---|---|---|
| 2005/0152452 A1* | 7/2005 | Suzuki | H04N 19/513 375/240.16 |
| 2010/0020876 A1* | 1/2010 | Jeon | H04N 19/159 375/240.16 |
| 2013/0170544 A1* | 7/2013 | Hao | H04N 19/46 375/240.03 |
| 2013/0287120 A1* | 10/2013 | Kwon | H04N 19/91 375/240.26 |
| 2013/0301702 A1* | 11/2013 | Minoo | H04N 19/30 375/240.02 |
| 2016/0219277 A1* | 7/2016 | Ozerov | H04N 19/184 |
| 2017/0104993 A1 | 4/2017 | Jeong et al. | |
| 2018/0176576 A1 | 6/2018 | Rippel et al. | |
| 2019/0034734 A1* | 1/2019 | Yen | G06T 7/246 |
| 2019/0384981 A1* | 12/2019 | Swaminathan | G06K 9/6256 |

\* cited by examiner

METHOD AND APPARATUS FOR IMAGE PROCESSING USING CONTEXT-ADAPTIVE ENTROPY MODEL

CROSS REFERENCE TO RELATED APPLICATIONS

This application claims the benefit of Korean Patent Application Nos. 10-2018-0114613, filed Sep. 27, 2018 and 10-2019-0118058, filed Sep. 25, 2019, which are hereby incorporated by reference in their entireties into this application.

BACKGROUND OF THE INVENTION

1. Technical Field

The following embodiments relate generally to a video-decoding method and apparatus and a video-encoding method and apparatus, and more particularly, to a decoding method and apparatus and an encoding method and apparatus using a context-adaptive entropy model.

2. Description of the Related Art

Recently, Artificial Neural Networks (ANNs) have been applied to various areas, and have achieved a number of breakthroughs resulting from the superior optimization and representation learning performance thereof.

In particular, since ANNs are intuitive, a lot of ANN-based research into various problems that can be solved by human beings for a short period has been conducted, and significant progress has been made.

However, with respect to image compression, relatively slow progress has been made due to the complicated target problems in image compression.

Furthermore, due to a great amount of heuristics accumulated through the standardization history and firm structures of traditional codecs over several decades, most tasks related to image compression place emphasis on the improvement of qualities of reconstructed images.

For example, several approaches have proposed a method for reducing artifacts in image compression, relying on the superior image restoration capability of ANNs.

Although it is indisputable that artifact reduction is one of the most promising areas in which the advantages of ANNs are exploited, such approaches can be regarded as a type of post-processing, rather than image compression itself.

SUMMARY OF THE INVENTION

An embodiment is intended to provide an ANN-based encoding apparatus and method and decoding apparatus and method, which exhibit better performance than traditional image codecs.

In accordance with an aspect, there is provided an encoding method, including generating a bitstream by performing entropy encoding that uses an entropy model on an input image; and transmitting or storing the bitstream.

The entropy model may be a context-adaptive entropy model.

The context-adaptive entropy model may exploit multiple different types of contexts.

The multiple different types of contexts may include a bit-consuming context and a bit-free context.

A standard deviation parameter and a mean parameter of the entropy model may be estimated from the multiple different types of contexts.

An input to an analysis transform of the context-adaptive entropy model may include uniformly quantized representations.

The entropy model may be based on a Gaussian model having a mean parameter.

The entropy model may include a context-adaptive entropy model and a lightweight entropy model.

The latent representation may be split into a first part latent representation and a second part latent representation.

The first part latent representation may be quantized into a first quantized part latent representation.

The second part latent representation may be quantized into a second quantized part latent representation.

The first quantized part latent representation may be encoded using the context-adaptive entropy model.

The second quantized part latent representation may be encoded using the lightweight entropy model.

The lightweight entropy model may exploit scale estimation.

The lightweight entropy model may retrieve standard deviations directly estimated from an analysis transform.

In accordance with another aspect, there is provided a decoding apparatus, including a communication unit for acquiring a bitstream; and a processing unit for generating a reconstructed image by performing decoding that uses an entropy model on the bitstream.

In accordance with a further aspect, there is provided a decoding method, including acquiring a bitstream; and generating a reconstructed image by performing decoding that uses an entropy model on the bitstream.

The entropy model may be a context-adaptive entropy model.

The context-adaptive entropy model may exploit multiple different types of contexts.

The multiple different types of contexts may include a bit-consuming context and a bit-free context.

A standard deviation parameter and a mean parameter of the entropy model may be estimated from the multiple different types of contexts.

An input to an analysis transform of the context-adaptive entropy model may include uniformly quantized representations.

The entropy model may be based on a Gaussian model having a mean parameter.

The entropy model may include a context-adaptive entropy model and a lightweight entropy model.

The lightweight entropy model may exploit scale estimation.

The lightweight entropy model may retrieve standard deviations directly estimated from an analysis transform.

DESCRIPTION OF THE PREFERRED EMBODIMENTS

Figure 1:
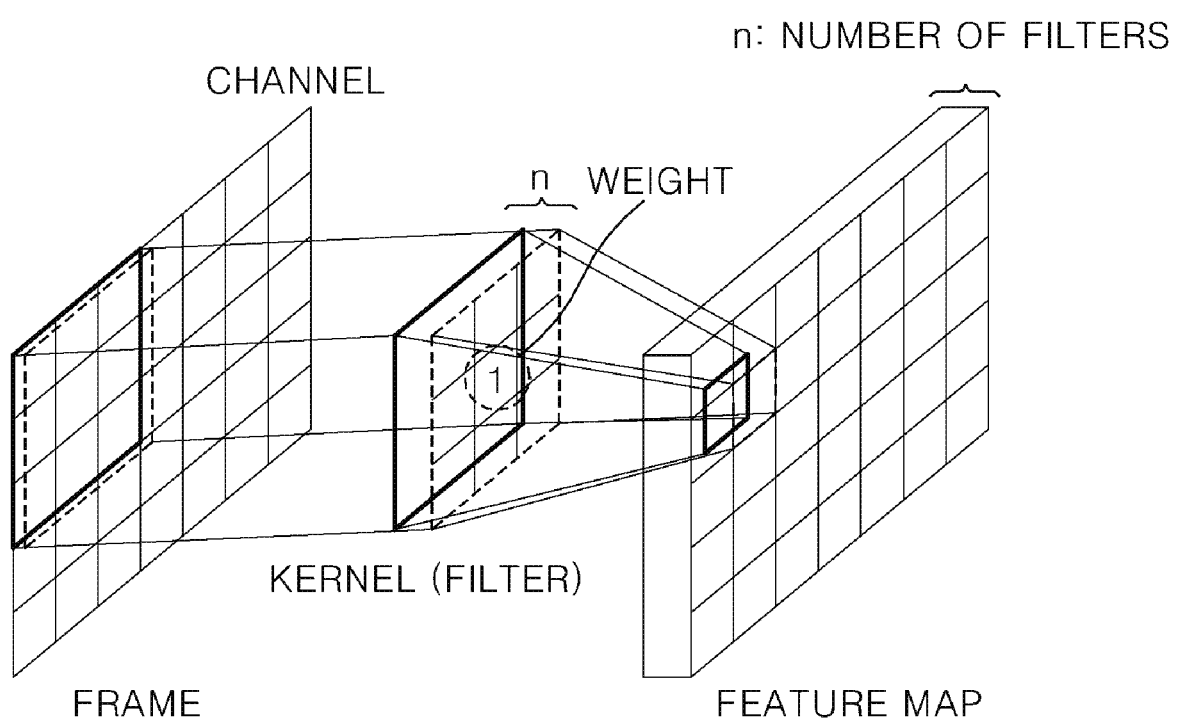
FIG. 1 illustrates an operation in a convolution layer according to an example.

The present disclosure may have various changes and various embodiments, and specific embodiments will be illustrated in the attached drawings and described in detail below. However, this is not intended to limit the present disclosure to particular modes of practice, and it is to be appreciated that all changes, equivalents, and substitutes that do not depart from the spirit or technical scope of the present disclosure are encompassed in the present disclosure.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but are not necessarily mutually exclusive from each other. For example, specific shapes, structures, and characteristics described herein may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

In the present disclosure, it will be understood that, although the terms "first", "second", etc. may be used herein to describe various components, these components should not be limited by these terms. These terms are only used to distinguish one component from other components. For instance, a first component discussed below could be termed a second component without departing from the teachings of the present disclosure. Similarly, a second component could also be termed a first component. The term "and/or" includes any and all combinations of one or more of the associated listed items.

It will be understood that when a component is referred to as being "connected" or "coupled" to another component, it can be directly connected or coupled to the other component, or intervening components may be present. In contrast, it should be understood that when a component is referred to as being "directly coupled" or "directly connected" to another component, there are no intervening component present.

The components described in the embodiments are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present specification, as long as it does not depart from the essence of the present specification.

Further, it should be noted that, in exemplary embodiments, an expression describing that a component "comprises" a specific component means that additional components may be included in the scope of the practice or the technical spirit of exemplary embodiments, but do not preclude the presence of components other than the specific component.

The terms used in the present specification are merely used to describe specific embodiments and are not intended to limit the present disclosure. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Further, some components are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments of the present disclosure are described with reference to the accompanying drawings in order to describe the present disclosure in detail so that those having ordinary knowledge in the technical field to which the present disclosure pertains can easily practice the present disclosure. In the following description of the present disclosure, detailed descriptions of known functions and configurations which are deemed to make the gist of the present disclosure obscure will be omitted. It should be noted that the same reference numerals are used to designate the same or similar components throughout the drawings, and that descriptions of the same components will be omitted.

Hereinafter, "image" may mean a single picture constituting a part of a video, or may mean the video itself. For example, "encoding and/or decoding of an image" may mean "encoding and/or decoding of a video", and may also mean "encoding and/or decoding of any one of images constituting the video".

Hereinafter, the term "encoding" may be used as the meaning of coding.

Convolution Layer

FIG. 1 illustrates an operation in a convolution layer according to an example.

A convolution layer may perform filtering on an input frame, and may output a feature map as a result of the filtering. The feature map may be used as the input of a subsequent layer. By means of this structure, the input frame may be successively processed by multiple layers.

In the convolution layer, a kernel may be a filter for performing a convolution operation or filtering. The size of the kernel may be referred to as a "kernel size" or a "filter size". Operation parameters constituting the kernel may also be referred to as "weights", "kernel parameters" or "filter parameters".

In the convolution layer, different types of filters may be used for a single input. In this case, a procedure in which a single filter processes the input may be referred to as a "convolution channel".

As illustrated in FIG. 1, the convolution layer may reduce a number of samples identical to a kernel size to a single sample. In FIG. 1, the size of an exemplified kernel may be 3×3. In other words, in FIG. 1, a procedure in which a convolution operation is performed by a filter having a 3×3 kernel size is illustrated.

In FIG. 1, an operation may be performed on a rectangle having a bold edge in an input image. Here, a window may be an operation region, such as the rectangle having the bold edge. The window may be moved from an upper-left portion of a frame to a lower-right portion by one space, and the size of the movement may be adjusted.

For the filter of the convolution operation, a stride and padding may be used.

A stride may be the size of movement. The value of the stride illustrated in FIG. 1 may be 1. When the value of the stride is 2, operations may be performed on windows extended by two spaces.

Padding may be intended to increase the size of an input image, and may be the operation of populating regions above, below, to the left, and to the right of the input image with specific values.

Pooling Layer

Figure 2:
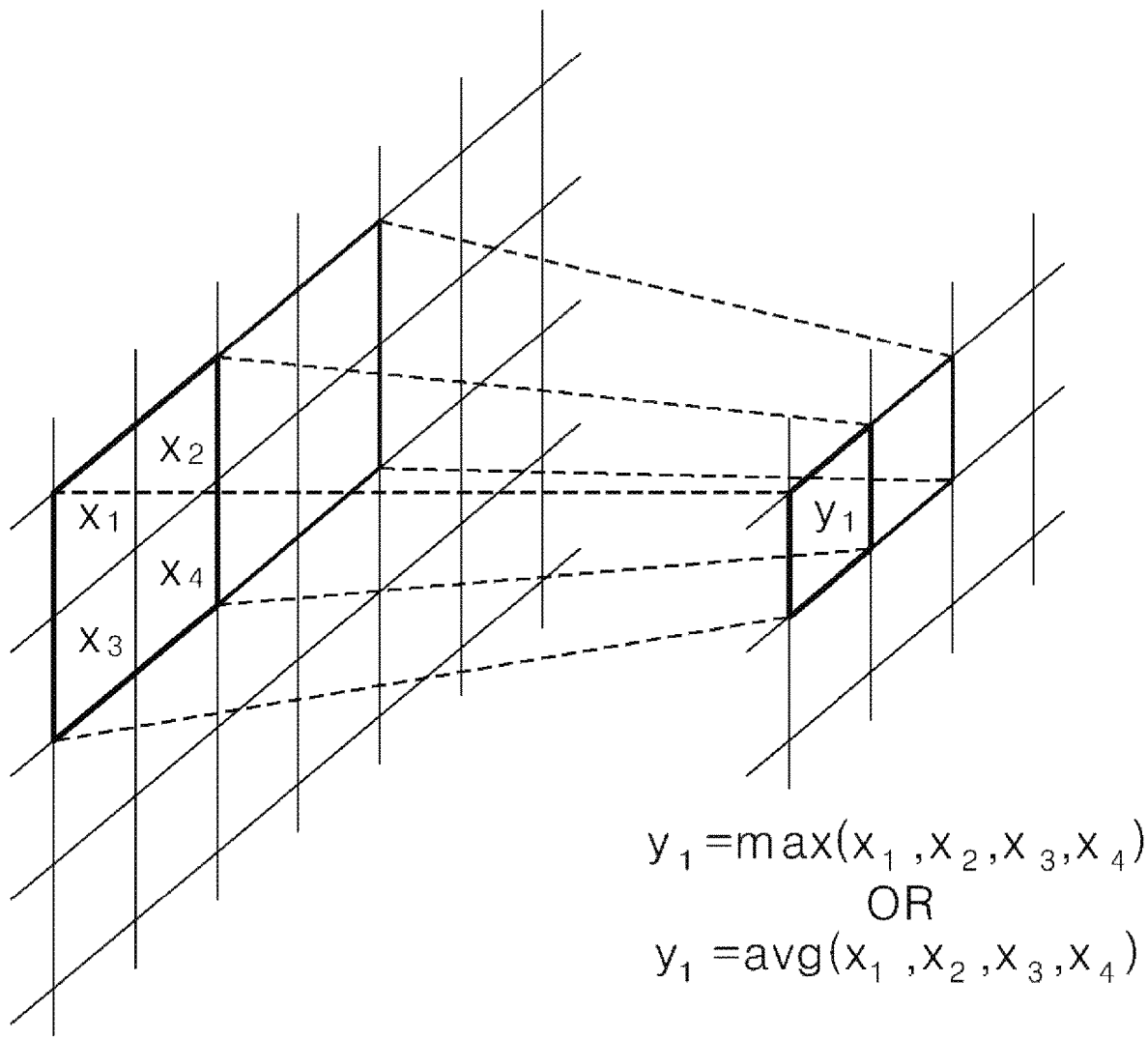
FIG. 2 illustrates an operation in a pooling layer according to an example.

FIG. 2 illustrates an operation in a pooling layer according to an example.

Pooling may mean sub-sampling on a feature map acquired through an operation in the convolution layer.

As illustrated in FIG. 2, the pooling layer may select a representative sample from among samples having a specific size that pass through the pooling layer.

In pooling, the size of a stride and the size of a window may be generally identical to each other.

Pooling may include maximum (max) pooling and average pooling.

The max pooling may be intended to select, as the representative sample, a sample having the maximum value from among the samples having a specific size. For example, a sample having the maximum value may be selected as a representative sample from among 2×2 samples.

Average pooling may be intended to set the average value of samples having a specific size as a representative sample.

The pooling layer illustrated in FIG. 2 may perform the max pooling. For example, the pooling layer may select one sample from among the samples of a window having a 2×2 size. Through this selection, the horizontal and vertical lengths of the output from the pooling layer may be half those of the input of the pooling layer.

As illustrated in FIG. 2, the size of the stride and the size of the window may be set to '2'. For example, when values corresponding to a size of [h, w, n] are input to the pooling layer, values output from the pooling layer may correspond to a size of [h/2, w/2, n].

Deconvolution Layer

Figure 3:
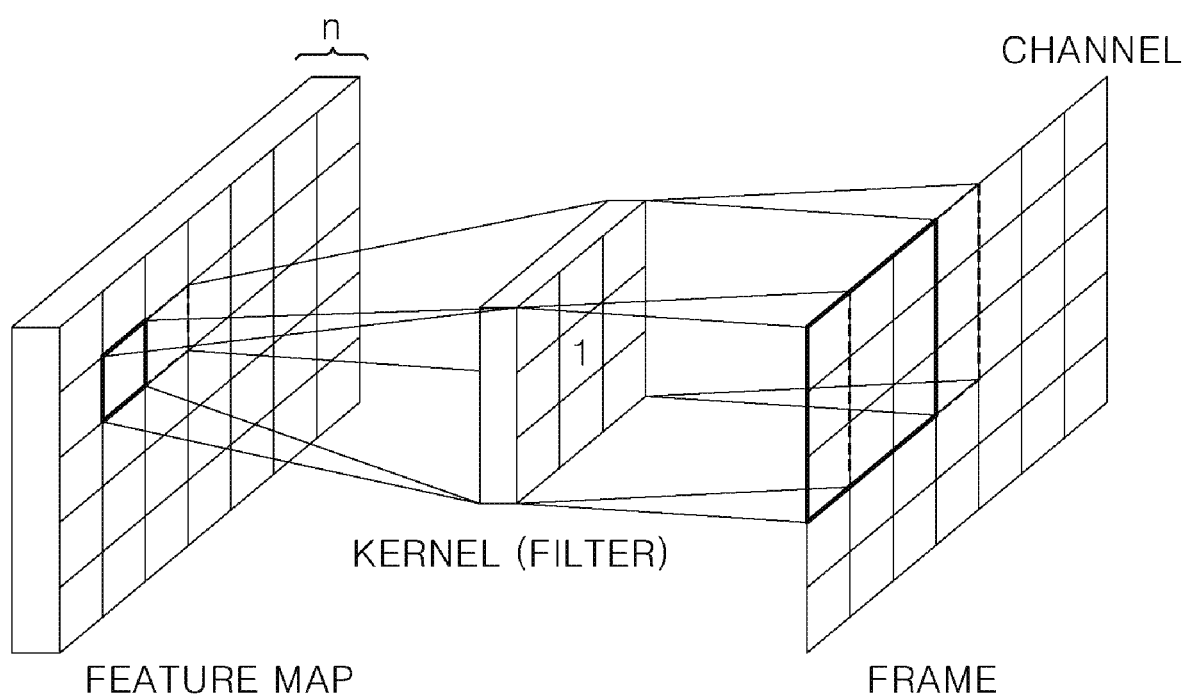
FIG. 3 illustrates an operation in a deconvolution layer according to an example.

FIG. 3 illustrates an operation in a deconvolution layer according to an example.

The deconvolution layer may perform an operation in a direction opposite the operation in a convolution layer. The operation in the convolution layer and the operation in the deconvolution layer may be regarded as being identical to each other except for the direction.

The deconvolution layer may perform a convolution operation on an input feature map, and may output a frame through the convolution operation.

The size of the output frame may change with the value of the stride. For example, when the value of the stride is 1, the horizontal size and the vertical size of the frame may be identical to the horizontal size and the vertical size of the feature map. When the value of the stride is 2, the horizontal size and the vertical size of the frame may be ½ of the horizontal size and the vertical size of the feature map.

Unpooling Layer

Figure 4:
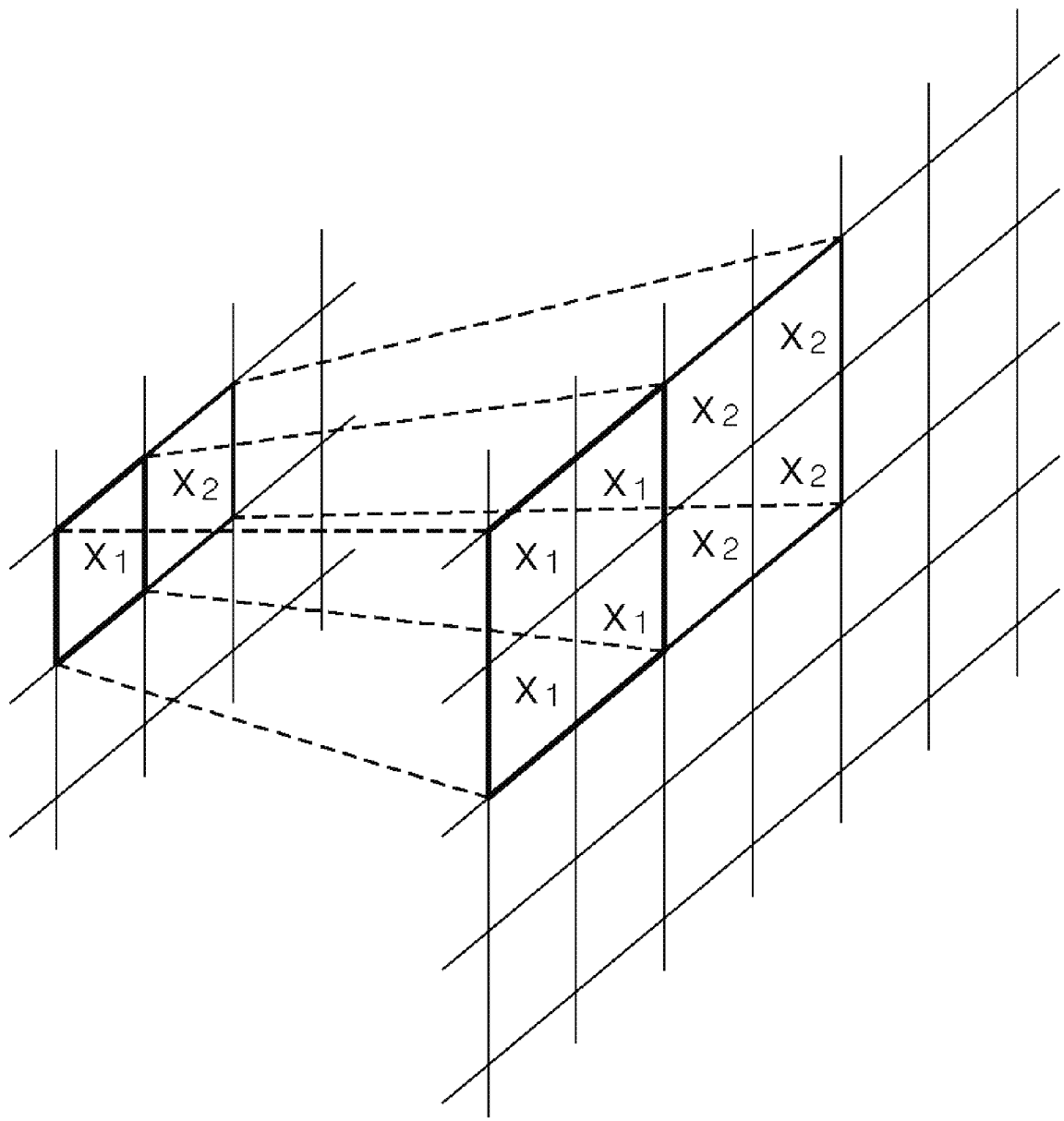
FIG. 4 illustrates an operation in an unpooling layer according to an example.

FIG. 4 illustrates an operation in an unpooling layer according to an example.

The unpooling layer may perform up-sampling in the direction opposite that of pooling in a pooling layer. The unpooling layer may perform a function of extending a dimension, contrary to that of the pooling layer. In other words, contrary to the pooling layer, the unpooling layer may enlarge each sample passing through the unpooling layer to samples having a specific size. For example, each of the samples passing through the unpooling layer may be enlarged to have a size corresponding to samples in a window having a 2×2 size.

For example, when values corresponding to a size of [h, w, n] are input to the unpooling layer, the values output from the unpooling layer may correspond to a size of [h*2, w*2, n]

Nonlinear Operation Layer

Figure 5:
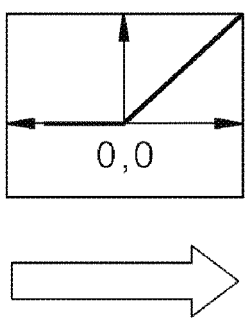
FIG. 5 illustrates an operation in a Rectified Linear Unit (ReLU) according to an example.

FIG. 5 illustrates an operation in a ReLU layer according to an example.

On the left side of FIG. 5, examples of values input to the ReLU layer are depicted, and on the right side of FIG. 5, examples of values output from the ReLU layer are depicted.

The ReLU layer may perform a nonlinear operation, such as that illustrated in FIG. 5. In embodiments, the ReLU layer may be replaced with a nonlinear operation layer.

The ReLU layer may generate output values by applying a transfer function to the input values.

The magnitudes of the values input to the ReLU layer may be equal to those of the values output from the ReLU layer. In other words, the magnitudes of the values passing through the ReLU layer may not change.

Auto-Encoder

Figure 6:
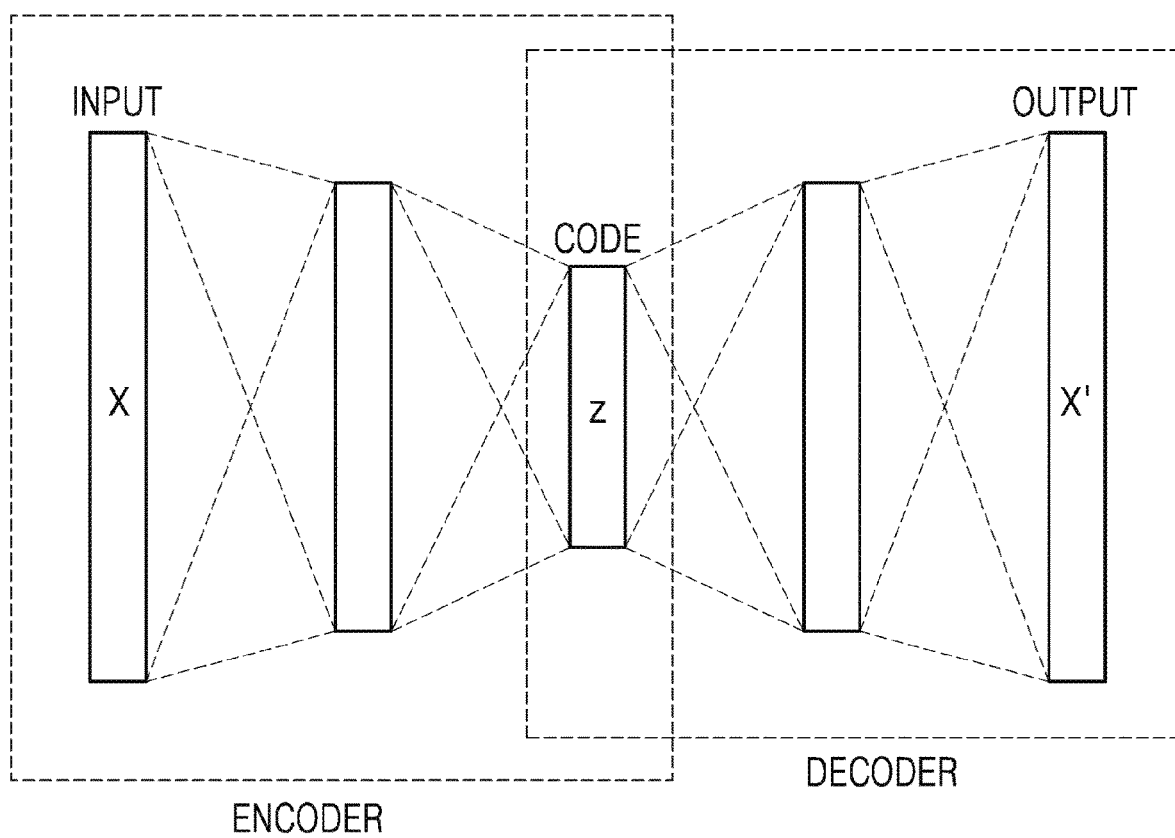
FIG. 6 illustrates an auto-encoder according to an example.

FIG. 6 illustrates an auto-encoder according to an example.

The auto-encoder may have a structure such as that illustrated in FIG. 6, and may be widely used in unsupervised learning.

A convolution encoder and a convolution decoder may be derived from the auto-encoder.

In accordance with the structure of the auto-encoder, the input and output dimensions may be identical to each other. The purpose of the auto-encoder may be to perform learning of $f(\ )$ so that $f(X)=X$ is established. X may be an input value.

In other words, the purpose of the auto-encoder may be intended to approximate an output prediction value X' to the input value X.

The auto-encoder may include an encoder and a decoder. The encoder may provide a code or a latent variable as an output value for the input value X. The code may be used as a feature vector for the input value X. The code may be input to the decoder. The decoder may output the prediction value X' formed from the code.

Convolution Encoder and Convolution Decoder

Figure 7:
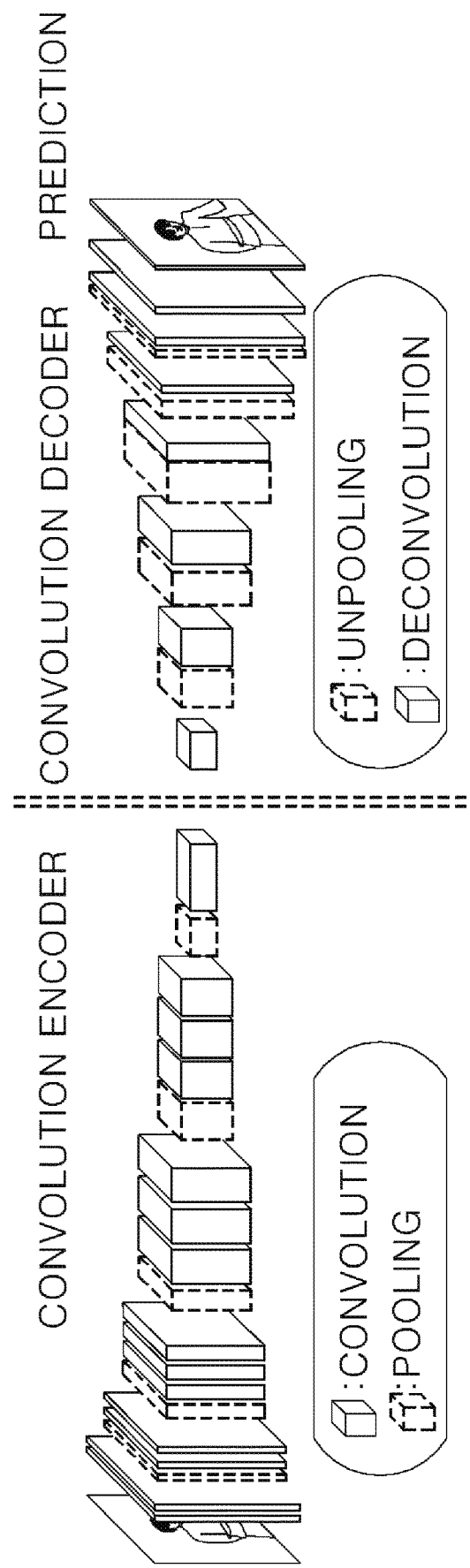
FIG. 7 illustrates a convolution encoder and a convolution decoder according to an example.

FIG. 7 illustrates a convolution encoder and a convolution decoder according to an example.

The structures of the convolution encoder and the convolution decoder may be implemented as a pair of a convolution layer and a deconvolution layer. Each of the convolution encoder and the convolution decoder may provide an input, a feature vector and an output, similar to the auto-encoder.

The convolution encoder may include a convolution layer and a pooling layer. The input to the convolution encoder may be a frame, and the output from the convolution encoder may be a feature map.

The convolution decoder may include a deconvolution layer and an unpooling layer. The input to the convolution decoder may be a feature map, and the output from the convolution decoder may be a (reconstructed) frame.

The features of convolution may be reflected in the structures of the convolution encoder and the convolution decoder. By means of this reflection, the convolution encoder and the convolution decoder may have smaller weights. The convolution encoder and the convolution decoder may be useful when operations are performed especially under the purpose of an optical flow and a counter edge for an output frame.

The convolution encoder may reduce the dimension by utilizing convolution and pooling, and may generate a feature vector from a frame. The feature vector may be generated at the output end of the convolution encoder.

The feature vector may be a vector representing the features of the original signal at a dimension lower than that of the original signal.

The convolution decoder may reconstruct a frame from the feature vector by utilizing deconvolution and unpooling.

ANN-Based Image Compression

In relation to ANN-based image compression, proposed methods may be divided into two streams.

First, as a consequence of the success of generative models, some image compression approaches for targeting superior perceptual quality have been proposed. The basic idea of these approaches is that learning the distribution of natural images enables the implementation of a very high compression level without severe perceptual loss by allowing the generation of image components, such as texture, which do not highly affect the structure or the perceptual quality of reconstructed images.

However, although the images generated by these approaches are very realistic, the acceptability of machine-created image components may eventually become somewhat application-dependent.

Second, some end-to-end optimized ANN-based approaches without using generative models may be used.

In these approaches, unlike traditional codecs including separate tools, such as prediction, transform, and quantization, a comprehensive solution covering all functions may be provided through the use of end-to-end optimization.

For example, one approach may exploit a small number of latent binary representations to contain compressed information in all steps. Each step may increasingly stack additional latent representations to achieve a progressive improvement in the quality of reconstructed images.

Other approaches may improve compression performance by enhancing a network structure in the above-described approaches.

These approaches may provide novel frameworks suitable for quality control over a single trained network. In these approaches, an increase in the number of iteration steps may be a burden on several applications.

These approaches may extract binary representations having as high entropy as possible. In contrast, other approaches may regard an image compression problem as how to retrieve discrete latent representations having as low entropy as possible.

In other words, the target problem of the former approaches may be regarded as how to include as much information as possible in a fixed number of representations, whereas the target problem of the latter approaches may be regarded as how to reduce the expected bit rate when a sufficient number of representations are given. Here, it may be assumed that low entropy corresponds to a low bit rate (i.e., a small number of bits) from entropy coding.

In order to solve the target problem of the latter approaches, the approaches may employ their own entropy models for approximating the actual distributions of discrete latent representations.

For example, some approaches may propose new frameworks that exploit entropy models, and may prove the performance of the entropy models by comparing the results generated by the entropy models with those of existing codecs, such as JPEG2000.

In these approaches, it may be assumed that each representation has a fixed distribution. In approaches, an input-adaptive entropy model for estimating the scale of the distribution of each representation may be used. Such an approach may be based on the characteristics of natural images indicating that the scales of representations are varying together within adjacent areas.

One of the principal elements in end-to-end optimized image compression may be a trainable entropy model used for latent representations.

Since the actual distributions of latent representations are not known, entropy models may calculate estimated bits for encoding latent representations by approximating the distributions of the latent representations.

When an input image x is transformed into a latent representation $y$ and then the latent representation $y$ is uniformly quantized into $\hat{y}$, which is a quantized latent representation, the simple entropy model can be represented by $p_{\hat{y}}(\hat{y})$.

$m(\hat{y})$ may indicate the actual marginal distribution of $\hat{y}$. A rate estimation calculated through cross entropy that uses the entropy model $p_{\hat{y}}(\hat{y})$ may be represented by the following Equation (1):

$$R = \mathbb{E}_{\hat{y} \sim m}[-\log_2 p_{\hat{y}}(\hat{y})] = H(m) + D_{KL}(m \| p_{\hat{y}}) \quad (1)$$

The rate estimation may be decomposed into the actual entropy of and $\hat{y}$ and additional bits. In other words, the rate estimation may include the actual entropy of $\hat{y}$ and the additional bits.

The additional bits may result from the mismatch between actual distributions and the estimations of the actual distributions.

Therefore, during a training process, decreasing a rate term R allows the entropy model $p_{\hat{y}}(\hat{y})$ to approximate the m($\hat{y}$) as closely as possible, and other parameters may smoothly transform x into $y$ so that the actual entropy of $\hat{y}$ is reduced.

From the standpoint of Kullback-Leibler (KL)-divergence, R may be minimized when p$\hat{y}$($\hat{y}$) completely matches the actual distribution m($\hat{y}$). This may mean that the compression performance of the above-described methods may essentially depend on the performance of the entropy models.

In an embodiment, in order to improve performance, a new entropy model that exploits two types of contexts may be proposed. The two types of contexts may be a bit-consuming context and a bit-free context.

The bit-consuming context and the bit-free context may be classified depending on whether the corresponding context requires the allocation of additional bits for transmission.

By utilizing these types of contexts, the proposed entropy model may more accurately estimate the distribution of each latent representation using a more generalized form of entropy models. Also, the proposed entropy model may more efficiently reduce spatial dependencies between adjacent latent representations through such accurate estimation.

The following effects may be acquired through the embodiments to be described later.

A new context-adaptive entropy model framework for incorporating two different types of contexts may be provided.

The improvement directions of methods according to embodiments may be described in terms of the model capacity and the level of contexts.

In an ANN-based image compression domain, test results outperforming existing image codecs that are widely used in terms of a peak Signal-to-Noise Ratio (PSNR) may be provided.

Further, the following descriptions related to the embodiments will be made later.

1) Key approaches of end-to-end optimized image compression may be introduced, and a context-adaptive entropy model may be proposed.

2) The structures of encoder and decoder models may be described.

3) The setup and results of experiments may be provided.

4) The current states and improvement directions of embodiments may be described.

End-to-End Optimization Based on Context-Adaptive Entropy Models

Entropy Models

The entropy models according to embodiments may approximate the distribution of discrete latent representations. By means of this approximation, the entropy models may improve image compression performance.

Some of the entropy models according to the embodiments may be assumed to be non-parametric models, and others may be Gaussian-scale mixture models, each composed of six-weighted zero-mean Gaussian models per representation.

Although it is assumed that the forms of entropy models are different from each other, the entropy models may have a common feature in that the entropy models concentrate on learning the distributions of representations without considering input adaptability. In other words, once entropy models are trained, the models trained for the representations may be fixed for any input during a test time.

In contrast, a specific entropy model may employ input-adaptive scale estimation for representations. The assumption that latent representation scales from natural images tend to move together within an adjacent area may be applied to such an entropy model.

In order to reduce such redundancy, the entropy models may use a small amount of additional information. By means of the additional information, proper scale parameters (e.g., standard deviations) of latent representations may be estimated.

In addition to scale estimation, when a prior probability density function (PDF) for each representation in a continuous domain is convolved with a standard uniform density function, the entropy models may much more closely approximate the prior Probability Mass Function (PMF) of the discrete latent representation, which is uniformly quantized by rounding.

For training, uniform noise may be added to each latent representation. This addition may be intended to fit the distribution of noisy representations into the above-mentioned PMF-approximating functions.

By means of these approaches, the entropy models may achieve the newest (state-of-the-art) compression performance, close to that of Better Portable Graphics (BPG).

Spatial Dependencies of Latent Variables

When latent representations are transformed over a convolutional neural network, the same convolution filters are shared across spatial regions, and natural images have various factors in common in adjacent regions, and thus the latent representations may essentially contain spatial dependencies.

In entropy models, these spatial dependencies may be successfully captured and compression performance may be improved by input-adaptively estimating standard deviations of the latent representations.

Moreover, in addition to standard deviations, the form of an estimated distribution may be generalized through the estimation of a mean value (mu) that exploits contexts.

For example, assuming that certain representations tend to have similar values within spatially adjacent areas, when all neighboring representations have a value of 10, it may be intuitively predicted that the possibility that the current representation will have values equal to or similar to 10 is relatively strong. Therefore, this simple estimation may decrease entropy.

Similarly, the entropy model according to the method in the embodiment may use a given context so as to estimate the mean (mu) and the standard deviation of each latent representation.

Alternatively, the entropy model may perform context-adaptive entropy coding by estimating the probability of each binary representation.

However, such context-adaptive entropy coding may be regarded as separate components, rather than as one of end-to-end optimization components, because the probability estimation thereof does not directly contribute to the rate term of a Rate-Distortion (R-D) optimization framework.

The latent variables m($\hat{y}$) of two different approaches and normalized versions of these latent variables may be exemplified. By means of the foregoing two types of contexts, one approach may estimate only standard deviation parameters, and the other may estimate the mu and the standard deviation parameters. Here, when the mu is estimated together with the given contexts, spatial dependency may be more efficiently removed.

Context-Adaptive Entropy Model

In the optimization problem in the embodiment, an input image x may be transformed into a latent representation $y$ having low entropy, and spatial dependencies of $y$ may be captured into $\hat{z}$. Therefore, four fundamental parametric transform functions may be used. The four parametric transform function parameters of the entropy model may be given by 1) to 4).

1) Analysis transform $g_a(x; \phi_g)$ for transforming x into a latent representation $\mathcal{Y}$ 2) Synthesis transform $g_s(\hat{\mathcal{Y}}; \theta_g)$ for generating a reconstructed image $\hat{x}$ 3) Analysis transform $h_a(\hat{\mathcal{Y}}; \phi_h)$ for capturing spatial redundancies of $\hat{\mathcal{Y}}$ into a latent representation z 4) Synthesis transform $h_s(\hat{z}; \theta_h)$ for generating contexts for model estimation.

In an embodiment, $h_s$ may not directly estimate standard deviations of representations. Instead, in an embodiment, $h_s$ may be used to generate a context c', which is one of two types of contents, so as to estimate the distribution. The two types of contexts will be described later.

From the viewpoint of a variational autoencoder, the optimization problem may be analyzed, and the minimization of Kullback-Leibler Divergence (KL-divergence) may be regarded as the same problem as the R-D optimization of image compression. Basically, in an embodiment, the same concept may be employed. However, for training, in an embodiment, discrete representations on conditions, instead of noisy representations, may be used, and thus the noisy representations may be used only as the inputs of entropy models.

Experientially, the use of discrete representations on conditions may produce better results. These results may be due to the removal of mismatch between the conditions of a training time and a testing time and the increase of training capacity caused by the removal of the mismatch. The training capacity may be improved by restricting the effect of uniform noise only to help the approximation to probability mass functions.

In an embodiment, in order to handle discontinuities from uniform quantization, a gradient overriding method having an identity function may be used. The resulting objective functions used in the embodiment may be given by the following Equation (2):

$$\mathcal{L} = R + \lambda D$$

$$\text{with } R = \mathbb{E}_{x \sim p_x} \mathbb{E}_{\tilde{\mathcal{Y}}, \tilde{z} \sim q}[-\log p_{\tilde{\mathcal{Y}}|\hat{z}}(\tilde{\mathcal{Y}}|\hat{z}) - \log p_{\tilde{z}}]$$

$$D = \mathbb{E}_{x \sim p_x}[-\log p_{x|\hat{\mathcal{Y}}}(x|\hat{\mathcal{Y}})] \quad (2)$$

In Equation (2), total loss includes two terms. The two terms may indicate rates and distortions. In other words, the total loss may include a rate term R and a distortion term D.

The coefficient λ may control the balance between the rates and the distortions during R-D optimization.

$$q(\tilde{\mathcal{Y}}, \tilde{z} | x, \phi_g, \phi_h) = \quad (3)$$

$$\prod_i \mathcal{U}\left(\tilde{\mathcal{Y}}_i \mid \mathcal{Y}_i - \frac{1}{2}, \mathcal{Y}_i + \frac{1}{2}\right) \cdot \prod_j \mathcal{U}\left(\tilde{z}_j \mid z_j - \frac{1}{2}, z_j + \frac{1}{2}\right)$$

$$\text{with } \mathcal{Y} = g_a(x; \phi_g), \hat{\mathcal{Y}} = Q(\mathcal{Y}), z = h_a(\hat{\mathcal{Y}}; \phi_h)$$

Here, when $\mathcal{Y}$ is the result of a transform $g_a$ and z is the result of a transform $h_a$, noisy representations of $\tilde{\mathcal{Y}}$ and $\tilde{z}$ may follow a standard uniform distribution. Here, the mean value of $\tilde{\mathcal{Y}}$ may be $\mathcal{Y}$, and the mean value of $\tilde{z}$ may be Z. Also, input to $h_a$ may be $\hat{\mathcal{Y}}$ other than the noisy representation $\tilde{\mathcal{Y}}$. $\hat{\mathcal{Y}}$ may indicate uniformly quantized representations of $\mathcal{Y}$ caused by a rounding function Q.

The rate term may indicate expected bits calculated with the entropy models of $p\tilde{\mathcal{Y}}_{|\hat{z}}$ and $p_{\tilde{z}}$. $p\tilde{\mathcal{Y}}_{|\hat{z}}$ may eventually be the approximation of $p\hat{\mathcal{Y}}_{\hat{z}}$, and $p_{\tilde{z}}$ may eventually be the approximation of $p_{\hat{z}}$.

The following Equation (4) may indicate an entropy model for approximating the bits required for $\hat{\mathcal{Y}}$. In addition, Equation (4) may be a formal expression of the entropy model.

$$p_{\tilde{\mathcal{Y}}|\hat{z}}(\tilde{\mathcal{Y}} | \hat{z}, \theta_h) = \prod_i \left(\mathcal{N}(\mu_i, \sigma_i^2) * \mathcal{U}\left(-\frac{1}{2}, \frac{1}{2}\right)\right)(\tilde{\mathcal{Y}}_i) \quad (4)$$

with $\mu_i, \sigma_i = f(c_i', c_i'')$, $c_i' = E'(h_s(\hat{z}; \theta_h), i)$, $c_i'' = E''(\langle \hat{\mathcal{Y}} \rangle, i)$, $\hat{z} = Q(z)$ The entropy model may be based on a Gaussian model having not only a standard deviation parameter $\sigma_i$ but also a mean (mu) parameter $\mu_i$.

The values of $\sigma_i$ and $\mu_i$ may be estimated from the two types of given contexts based on a function $f$ in a deterministic manner. The function $f$ may be a distribution estimator.

The two types of contexts may be a bit-consuming context and a bit-free context, respectively. Here, the two types of contexts for estimating the distribution of a certain representation may be indicated by $c'_i$ and $c''_i$, respectively.

An extractor E' may extract $c'_i$ from c'. c' may be the result of the transform $h_s$.

In contrast to c', the allocation of an additional bit may not be required for $c''_i$. Instead, known (previously entropy-encoded or entropy-decoded) subsets of $\hat{\mathcal{Y}}$ may be used. The known subsets of $\hat{\mathcal{Y}}$ may be represented by $\langle \hat{\mathcal{Y}} \rangle$.

An extractor E" may extract $c''_i$ from $\langle \hat{\mathcal{Y}} \langle$.

An entropy encoder and an entropy decoder may sequentially process $\hat{\mathcal{Y}}_i$ in the same specific order, such as in raster scanning. Therefore, when the same $\hat{\mathcal{Y}}_i$ is processed, $\langle \hat{\mathcal{Y}} \rangle$ given to the entropy encoder and the entropy decoder may always be identical.

In the case of $\hat{z}$, a simple entropy model is used. Such a simple entropy model may be assumed to follow zero-mean Gaussian distributions having a trainable σ.

$\hat{z}$ may be regarded as additional (side) information, and may make a very small contribution to the total bit rate. Therefore, in an embodiment, a simplified version of the entropy model, other than more complicated entropy models, may be used for end-to-end optimization in all parameters of the proposed method.

The following Equation (5) may indicate a simplified version of the entropy model.

$$p_{\hat{z}}(\tilde{z}) = \prod_j \left(\mathcal{N}(0, \sigma_j^2) * \mathcal{U}\left(-\frac{1}{2}, \frac{1}{2}\right)\right)(\tilde{z}_j) \quad (5)$$

A rate term may be an estimation calculated from entropy models, as described above, rather than the amount of real bits. Therefore, in training or encoding, actual entropy-encoding or entropy-decoding processes may not be essentially required.

In the case of a distortion term, it may be assumed that $p_x|\hat{y}$ follows a Gaussian distribution, which is a widely used distortion metric. Under the assumption, the distortion term may be calculated using a Mean-Squared Error (MSE).

Encoder-Decoder Model

Figure 8:
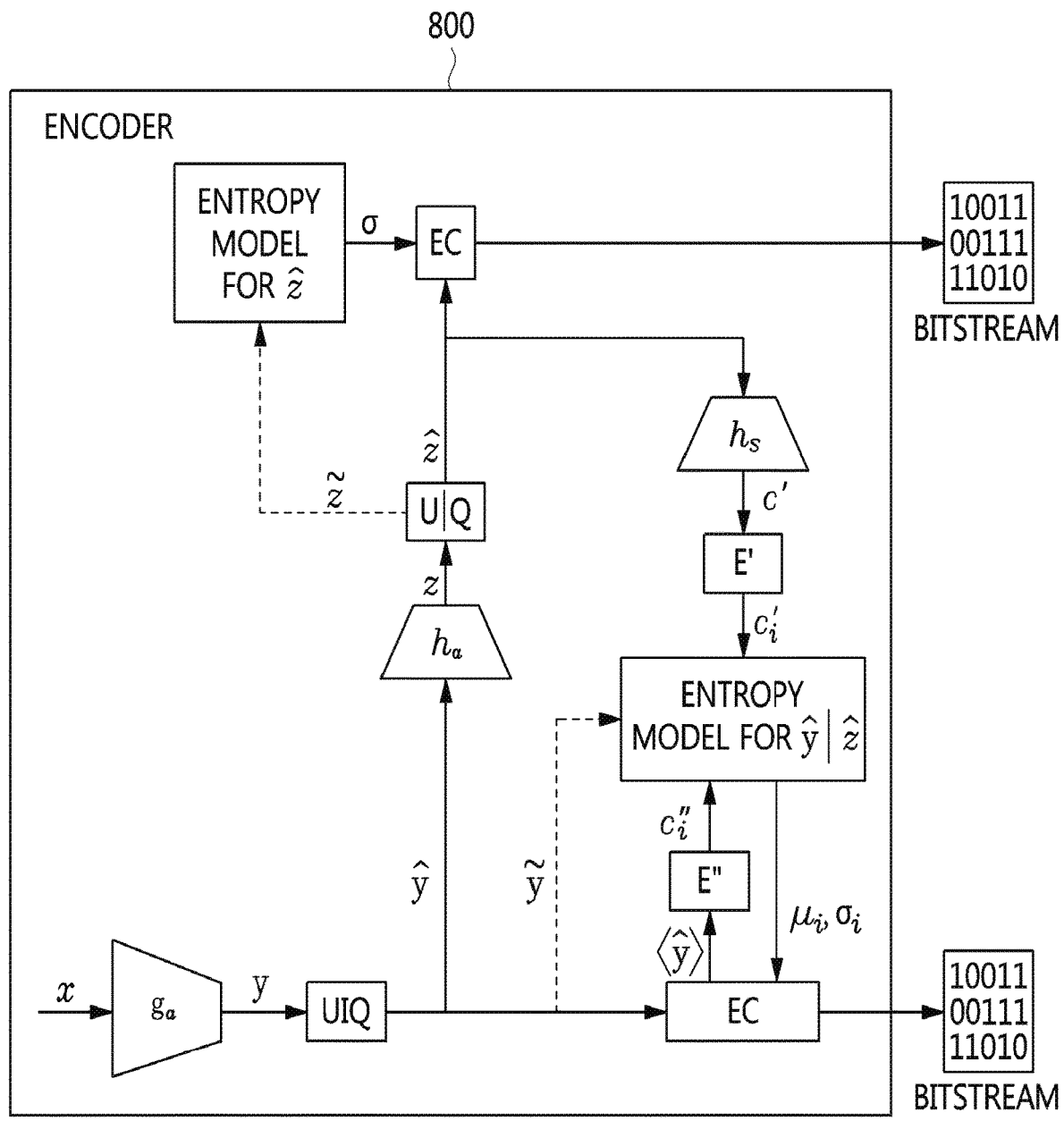
FIG. 8 illustrates an encoder according to an embodiment.

FIG. 8 illustrates an encoder according to an embodiment.

In FIG. 8, small icons on the right side indicate entropy-encoded bitstreams.

In FIG. 8, EC may indicate entropy coding (i.e., entropy encoding). U|Q may indicate uniform noise addition or uniform quantization.

Also, in FIG. 8, noisy representations are indicated by dotted lines. In an embodiment, noisy representations may be inputs to entropy models, and may be used only for training.

The operations and interaction of an encoder 800 and a decoder 900 will be described in detail later.

Figure 9:
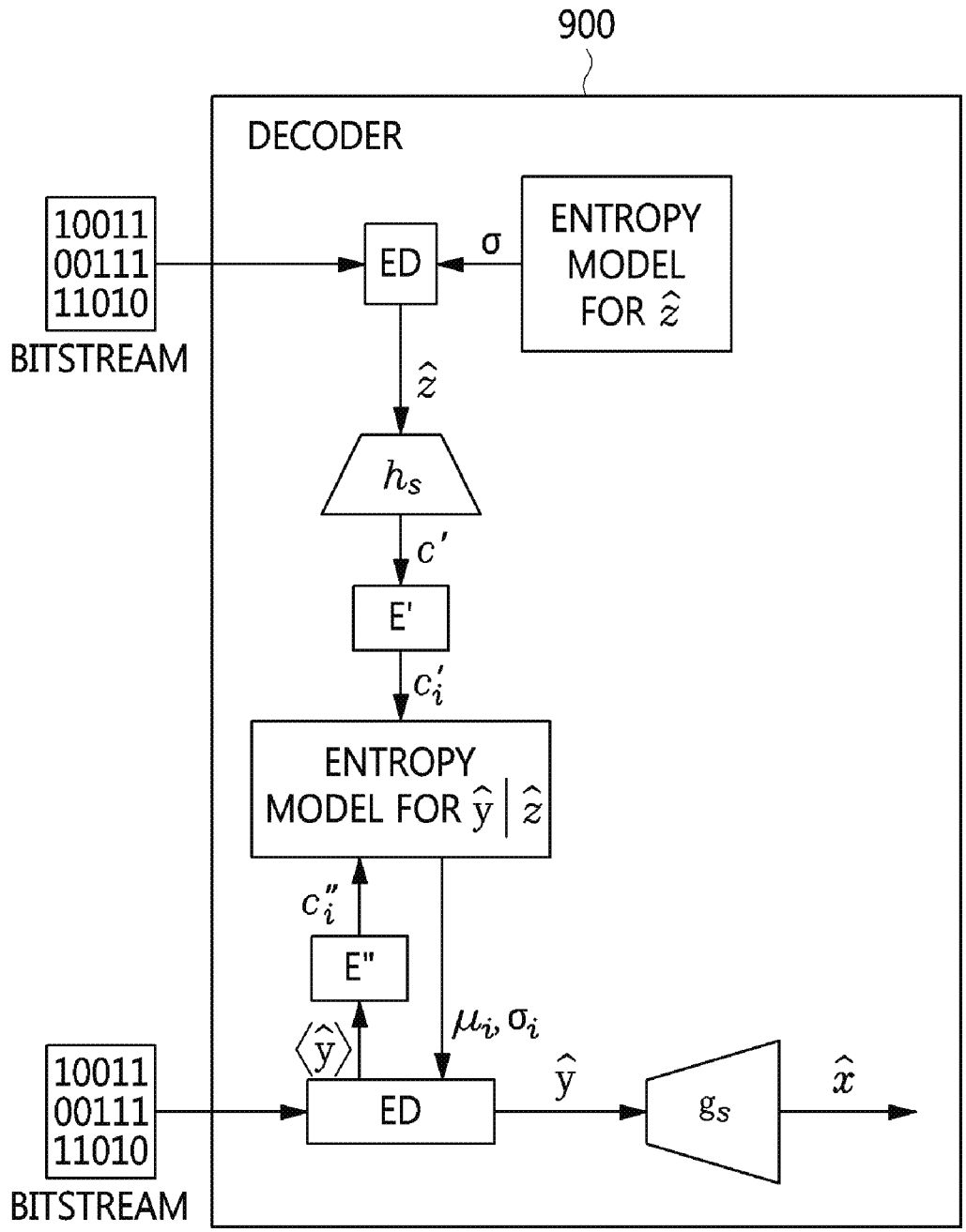
FIG. 9 illustrates a decoder according to an embodiment.

FIG. 9 illustrates a decoder according to an embodiment.

In FIG. 9, small icons on the left side may indicate entropy-encoded bitstreams.

ED may indicate entropy decoding.

The operations and interaction of the encoder 800 and the decoder 900 will be described in detail later.

The encoder 800 may transform an input image into latent representations. The encoder may generate quantized latent representations by quantizing the latent representations. Also, the encoder may generate entropy-encoded latent representations by performing entropy encoding, which uses trained entropy models, on the quantized latent representations, and may output the entropy-encoded latent representations as bitstreams.

The trained entropy models may be shared between the encoder 800 and the decoder 900. In other words, the trained entropy models may also be referred to as shared entropy models.

In contrast, the decoder 900 may receive entropy-encoded latent representations through bitstreams. The decoder 900 may generate latent representations by performing entropy decoding, which uses the shared entropy models, on the entropy-encoded latent representations. The decoder 900 may generate a reconstructed image using the latent representations.

In the encoder 800 and the decoder 900, all parameters may be assumed to have been already trained.

The structure of the encoder-decoder model may fundamentally include $g_a$ and $g_s$. $g_a$ may take charge of the transform of x into $y$, and $g_s$ may take charge of the inverse transform of $g_a$.

The transformed $y$ may be uniformly quantized into $\hat{y}$ through rounding.

Here, unlike in conventional codecs, in approaches based on entropy models, tuning of quantization steps is usually unnecessary because the scales of representations are optimized together via training.

Other components between $g_a$ and $g_s$ may function to perform entropy encoding (or entropy decoding) using 1) shared entropy models and 2) underlying context preparation processes.

More specifically, each entropy model may individually estimate the distribution of each $\hat{y}_i$. In the estimation of distribution of each $\hat{y}_i$, $\mu_i$ and $\sigma_i$ may be estimated from two types of given contexts, that is, $c'_i$ and $c''_i$.

Of these contexts, c' may be side information requiring the allocation of additional bits. In order to reduce the bit rate needed to carry c', a latent representation z transformed from $\hat{y}$ may be quantized and entropy-encoded by its own entropy model.

In contrast, $c''_i$ may be extracted from $\langle \hat{y} \rangle$ without the allocation of any additional bits.

Here, $\langle \hat{y} \rangle$ may change as entropy encoding or entropy decoding progresses. However, $\langle \hat{y} \rangle$ may always be identical both in the encoder 800 and the decoder 900 upon processing the same $\hat{y}_i$.

The parameters and entropy models of $h_s$ may simply be shared by both the encoder 800 and the decoder 900. As indicated by the dotted lines in FIG. 8, while training progresses, inputs to entropy models may be noisy representations. The noisy representations may allow the entropy models to approximate the probability mass functions of discrete representations.

Figure 10:
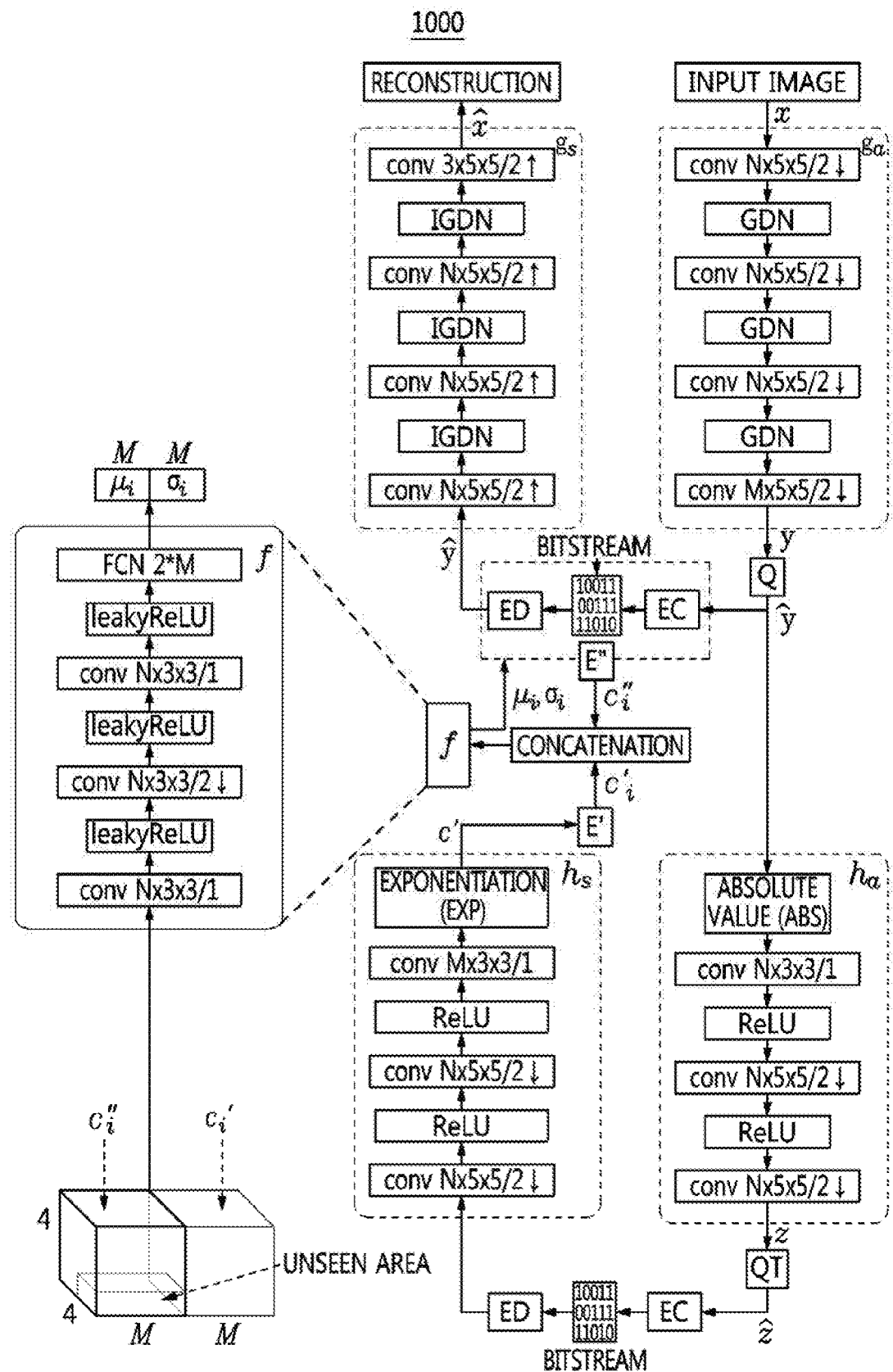
FIG. 10 illustrates the implementation of an autoencoder according to an embodiment.

FIG. 10 illustrates the implementation of an autoencoder according to an embodiment.

In FIG. 10, the structures of the foregoing encoder 800 and decoder 900 may be represented by an autoencoder 1000. In other words, in an embodiment, for the encoder 800 and the decoder 900, a convolutional autoencoder structure may be used, and a distribution estimator f may be implemented together with convolutional neural networks.

In FIG. 10, convolution has been abbreviated as "conv". "GDN" may indicate generalized divisive normalization. "IGDN" may indicate inverse generalized divisive normalization.

In FIG. 10, leakyReLU may be a function, which is a deformation of ReLU, and may also be a function by which the degree of leakage is specified. A first set value and a second set value may be established for the leakyReLU function. The leakyReLU function may output an input value and the second set value without outputting the first set value when the input value is less than or equal to the first set value.

Also, the notations of convolutional layers used in FIG. 10 may be described as follows: the number of filters×filter height×filter width/(downscale or upscale factor).

Further, ↑ and ↓ may indicate upscaling and downscaling, respectively. For upscaling and downscaling, a transposed convolution may be used.

The convolutional neural networks may be used to implement transform and reconstruction functions.

Descriptions in the other embodiments described above may be applied to $g_a$, $g_s$, $h_a$, and $h_s$ illustrated in FIG. 10. Also, at the end of $h_s$, an exponentiation operator, rather than an absolute operator, may be used.

Components for estimating the distribution of each $\hat{y}_i$ are added to the convolutional autoencoder.

In FIG. 10, "Q" may denote uniform quantization (i.e., rounding). "EC" may denote entropy encoding. "ED" may denote entropy decoding. "f" may denote a distribution estimator.

Also, the convolutional autoencoder may be implemented using the convolutional layers. Inputs to the convolutional layers may be channel-wisely concatenated $c'_i$ and $c''_i$. The convolutional layers may output the estimated $\mu_i$ nd the estimated $\sigma_i$ as results.

Here, the same $c'_i$ and $c''_i$ may be shared by all $\hat{y}_i$ located at the same spatial position.

E' may extract all spatially-adjacent elements from c' across the channels so as to retrieve $c'_i$. Similarly, E" may extract all adjacent known elements from $\langle \rangle \hat{y}$ for $c''_i$. The extractions by the E' and E" may have the effect of capturing the remaining correlations between different channels.

The distribution estimator f may extract, from the same spatial position, 1) all M, 2) the total number of channels of $\mathcal{Y}$, and 3) distributions of $\hat{\mathcal{y}}_i$, at one step, and by these extractions, the total number of estimations may be decreased.

Further, parameters of f may be shared for all spatial positions of $\hat{\mathcal{y}}$. Thus, by means of this sharing, only one trained f per λ may be required in order to process any sized images.

However, in the case of training, in spite of the above-described simplifications, collecting the results from all spatial positions to calculate a rate term may be a great burden. In order to reduce such a burden, a specific number of random spatial points (e.g., 16) at every training step for a context-adaptive entropy model may be designated as representatives. Such designation may facilitate the calculation of the rate term. Here, the random spatial points may be used only for the rate term. In contrast, the distortion term may still be calculated for all images.

Since $\mathcal{Y}$ is a three-dimensional (3D) array, the index i of $\mathcal{Y}$ may include three indices k, l, and m. Here, k may be a horizontal index, l may be a vertical index, and m may be a channel index.

When the current position is (k, l, m), E' may extract $c'_{[k-2\ldots k+1],\,[l-3\ldots l],\,[1\ldots M]}$ as $c'_i$. Also, E" may extract $\langle\hat{\mathcal{y}}\rangle_{[k-2\ldots k+1],\,[l-3\ldots l],\,[1\ldots M]}$ as $c''_i$. Here, $\langle\hat{\mathcal{y}}\rangle$ may indicate the known area of $\hat{\mathcal{y}}$.

The unknown area of $\langle\hat{\mathcal{y}}\rangle$ may be padded with zeros (0). Because the unknown area of $\langle\hat{\mathcal{y}}\rangle$ is padded with zeros, the dimension of $\langle\hat{\mathcal{y}}\rangle$ may remain identical to that of $\hat{\mathcal{y}}$. Therefore, $c''_{i\,[3\ldots 4],4,[1\ldots M]}$ may always be padded with zeros.

In order to maintain the dimension of the estimated results at the input, marginal areas of c' and $\langle\hat{\mathcal{y}}\rangle$ may also be set to zeros.

When training or encoding is performed, $c''_i$ may be extracted using simple 4×4×M windows and binary masks. Such extraction may enable parallel processing. Meanwhile, in decoding, sequential reconstruction may be used.

As an additional implementation technique for reducing implementation costs, a hybrid approach may be used. The entropy model according to an embodiment may be combined with a lightweight entropy model. In the lightweight entropy model, representations may be assumed to follow a zero-mean Gaussian model having estimated standard deviations.

Such a hybrid approach may be utilized for the top-four cases in descending order of bit rate, among nine configurations. In the case of this utilization, it may be assumed that, for higher-quality compression, the number of sparse representations having a very low spatial dependency increases, and thus direct scale estimation provides sufficient performance for these added representations.

In implementation, the latent representation $\mathcal{Y}$ may be split into two parts $\mathcal{Y}_1$ and $\mathcal{Y}_2$. Two different entropy models may be applied to $\mathcal{Y}_1$ and $\mathcal{Y}_2$, respectively. The parameters of $g_a$, $g_s$, $h_a$ and $h_s$ may be shared, and all parameters may still be trained together.

For example, for bottom-five configurations having lower bit rates, the number of parameters N may be set to 182. The number of parameters M may be set to 192. A slightly larger number of parameters may be used for higher configurations.

For actual entropy encoding, an arithmetic encoder may be used. The arithmetic encoder may perform the above-described bitstream generation and reconstruction using the estimated model parameters.

As described above, based on an ANN-based image compression approach that exploits entropy models, the entropy models according to the embodiment may be extended to exploit two different types of contexts.

These contexts allow the entropy models to more accurately estimate the distribution of representations with a generalized form having both mean (mu) parameters and standard deviation parameters.

The exploited contexts may be divided into two types. One of the two types may be a kind of free context, and may contain the part of latent variables known both to the encoder 800 and to the decoder 900. The other of the two types may be contexts requiring the allocation of additional bits to be shared. The former may indicate contexts generally used by various codecs. The latter may indicate contexts verified to be helpful in compression. In an embodiment, the framework of entropy models exploiting these contexts has been provided.

In addition, various methods for improving performance according to embodiments may be taken into consideration.

One method for improving performance may be intended to generalize a distribution model that is the basis of entropy models. In an embodiment, performance may be improved by generalizing previous entropy models, and greatly acceptable results may be retrieved. However, Gaussian-based entropy models may apparently have limited expression power.

For example, when more elaborate models such as non-parametric models are combined with context-adaptivity in the embodiments, this combination may provide better results by reducing the mismatch between actual distributions and the estimated models.

An additional method for improving performance may be intended to improve the levels of contexts.

The present embodiment may use representations at lower levels within limited adjacent areas. When the sufficient capacity of networks and higher levels of contexts are given, more accurate estimation may be performed according to the embodiment.

For example, for the structures of human faces, when each entropy model understands that the structures generally have two eyes and symmetry is present between the two eyes, the entropy model may more accurately approximate distributions when encoding the remaining one eye by referencing the shape and position of one given eye.

For example, a generative entropy model may learn the distribution p(x) of images in a specific domain, such as human faces and bedrooms. Also, in-painting methods may learn a conditional distribution p(x|context) when viewed areas are given as context. Such high-level understanding may be combined with the embodiment.

Moreover, contexts provided through side information may be extended to high-level information, such as segmentation maps and additional information helping compression. For example, the segmentation maps may help the entropy models estimate the distribution of a representation discriminatively according to the segment class to which the representation belongs.

Figure 11:
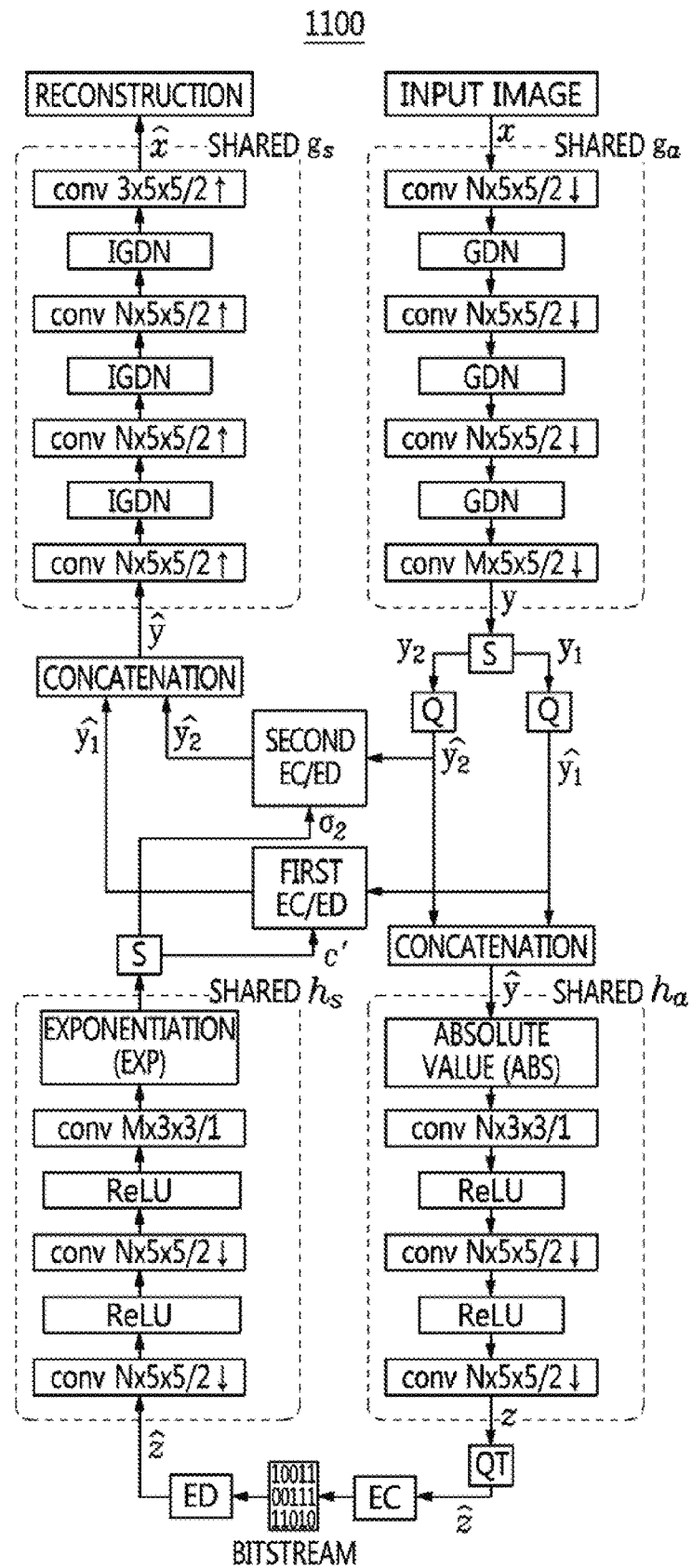
FIG. 11 illustrates the structure of a hybrid network for higher bit-rate environments according to an example.

FIG. 11 illustrates the structure of a hybrid network for higher bit-rate environments according to an example.

The notations used in FIG. 11 may be identical to those in the foregoing embodiment.

In FIG. 11, a first EC/ED may indicate entropy encoding and entropy decoding that use a context-adaptive entropy model in the foregoing embodiment. A second EC/ED following a zero-mean Gaussian model may indicate entropy encoding and entropy decoding that use a lightweight entropy model.

A hybrid network 1100 may be an ANN following the foregoing hybrid approach.

In the hybrid network 1100, a latent representation $\mathcal{Y}$ may be split into two parts, that is, a first part latent representation $\mathcal{Y}_1$ and a second part latent representation $\mathcal{Y}_2$, wherein $\mathcal{Y}_1$ may be quantized into a first quantized part latent representation $\hat{\mathcal{Y}}_1$ and $\mathcal{Y}_2$ may be quantized into a second quantized part latent representation $\hat{\mathcal{Y}}_2$.

One of the results from splitting, $\hat{\mathcal{Y}}_1$, may be encoded using a context-adaptive entropy model according to an embodiment. In contrast, the other of the results from splitting, $\hat{\mathcal{Y}}_2$, may be encoded using a simpler lightweight entropy model based on standard estimation.

All concatenation and split operators may be performed in a channel-wise manner.

A lightweight entropy model may be combined with a context-adaptive entropy model so as to reduce implementation costs for high Bits-Per-Pixel (BPP) configurations.

Such a lightweight entropy model may exploit scale (i.e., standard deviation) estimation on the assumption that Probability Mass Function (PMF) approximations of quantized representations follow zero-mean Gaussian distributions together with a standard uniform distribution.

The representation $\mathcal{Y}$ may be split into two parts $\mathcal{Y}_1$ and $\mathcal{Y}_2$ in a channel-wise manner. $\mathcal{Y}_1$ may have $M_1$ channels. $\mathcal{Y}_2$ may have $M_2$ channels. Next, $\mathcal{Y}_1$ and $\mathcal{Y}_2$ may be quantized. As $\mathcal{Y}_1$ is quantized, $\hat{\mathcal{Y}}_1$ may be generated. As $\mathcal{Y}_2$ is quantized, $\hat{\mathcal{Y}}_2$ may be generated.

$\hat{\mathcal{Y}}_1$ may be entropy-encoded using the context-adaptive entropy model, whereas $\hat{\mathcal{Y}}_2$ may be entropy-encoded using the lightweight entropy model.

Standard deviations of $\hat{\mathcal{Y}}_2$ may be estimated using $h_a$ and $h_s$.

The context-adaptive entropy model may use the results of $h_a$ ($\hat{c}'$) as an input source to the estimator f. Unlike the context-adaptive entropy model, the lightweight entropy model may retrieve standard deviations directly estimated from $h_a$. Here, $h_a$ may take the concatenation of $\hat{\mathcal{Y}}_1$ and $\hat{\mathcal{Y}}_2$ as an input. $h_s$ may simultaneously generate $\sigma_2$ and $\hat{c}'$.

The following Equation (6) may indicate a total loss function.

$$\mathcal{L} = R + \lambda D$$

with $R = \mathbb{E}_{x \sim p_x} \mathbb{E}_{\tilde{y}_1, \tilde{y}_2, \tilde{z} \sim q} [-\log p_{\tilde{y}_1|\tilde{z}}(\tilde{y}_1|\tilde{z}) - \log p_{\tilde{y}_2|\tilde{z}}(\tilde{y}_2|\tilde{z}) - \log p_{\tilde{z}}]$ $$D = \mathbb{E}_{x \sim p_x}[-\log p_{x|\hat{\mathcal{Y}}}(x|\hat{\mathcal{Y}})] \quad (6)$$

The total loss function may also contain a rate term and a distortion term. The rate term may be divided into three terms $\hat{\mathcal{Y}}_1$, $\hat{\mathcal{Y}}_2$, and $\hat{z}$. That is, the rate term may include $\hat{\mathcal{Y}}_1$, $\hat{\mathcal{Y}}_2$, and $\hat{z}$. The distortion term may be identical to the distortion term in the above-described embodiment. However, $\hat{\mathcal{Y}}$ may be a channel-wise concatenated representation of $\hat{\mathcal{Y}}_1$ and $\hat{\mathcal{Y}}_2$.

$$q(\tilde{y}_1, \tilde{y}_2, \tilde{z}|x, \phi_g, \phi_h) = \prod_i \mathcal{U}\left(\tilde{y}_{1i} | \mathcal{Y}_{1i} - \frac{1}{2}, \mathcal{Y}_{1i} + \frac{1}{2}\right) \cdot \quad (7)$$

$$\prod_j \mathcal{U}\left(\tilde{y}_{2j} | \mathcal{Y}_{2j} - \frac{1}{2}, \mathcal{Y}_{2j} + \frac{1}{2}\right) \cdot \prod_k \mathcal{U}\left(\tilde{z}_k | z_k - \frac{1}{2}, z_k + \frac{1}{2}\right)$$

with $\mathcal{Y}_1, \mathcal{Y}_2 = S(g_a(x; \phi_g)), \tilde{y} = Q(\mathcal{Y}_1) \oplus Q(\mathcal{Y}_2), z = h_a(\hat{y}; \phi_h)$ Noisy representations of $\tilde{y}_1$, $\tilde{y}_2$, and $\tilde{z}$ may follow a standard uniform distribution. The mean value of $\tilde{y}_1$ may be $\mathcal{Y}_1$, the mean value of $\tilde{y}_2$ may be $\mathcal{Y}_2$, and the mean value of $\tilde{z}$ may be z.

$\mathcal{Y}_1$ and $\mathcal{Y}_2$ may be channel-wise split representations from $\mathcal{Y}$. $\mathcal{Y}$ may be the result of a transform $g_a$.

$\mathcal{Y}_1$ may have $M_1$ channels. $\mathcal{Y}_2$ may have $M_2$ channels.

$$p_{\tilde{y}_1|\hat{z}}(\tilde{y}_1|\hat{z}, \theta_h) = \prod_i \left(\mathcal{N}(\mu_{1i}, \sigma_{1i}^2) * \mathcal{U}\left(-\frac{1}{2}, \frac{1}{2}\right)\right)(\tilde{y}_{1i}) \quad (8)$$

with $\mu_{1i}, \sigma_{1i} = f(c_i', c_i'')$, $c_i' = E'(c', i)$, $c_i'' = E''(\langle \hat{\mathcal{Y}}_1 \rangle, i)$, $c', \sigma_2 = S(h_s(\hat{z}; \theta_h))$ The rate term for $\hat{\mathcal{Y}}_1$ may be the same model as that in the foregoing Equation (4).

$\hat{\sigma}_2$ may not contribute to the model for $\hat{\mathcal{Y}}_1$, but may contribute to the model for $\hat{\mathcal{Y}}_2$.

$$p_{\tilde{y}_2|\hat{z}}(\tilde{y}_2|\hat{z}, \theta_h) = \prod_j \left(\mathcal{N}(0, \sigma_{2j}^2) * \mathcal{U}\left(-\frac{1}{2}, \frac{1}{2}\right)\right)(\tilde{y}_{2j}) \quad (9)$$

In the rate term for $\hat{\mathcal{Y}}_2$, noisy representations may be merely used as the inputs of the entropy models for training. In other words, in the rate term for $\hat{\mathcal{Y}}_2$, noisy representations may not be used under the conditions of entropy models.

The entropy model of z may be the same as that in the forgoing Equation (5).

In implementation, a hybrid structure may be used for the top-four configurations in descending order of bit rate.

For example, for the top-two configurations, N may be set to 400, $M_1$ may be set to 192, and $M_2$ may be set to 408.

For example, for the next two configurations, N may be set to 320, $M_1$ may be set to 192, and $M_2$ may be set to 228.

Figure 12:
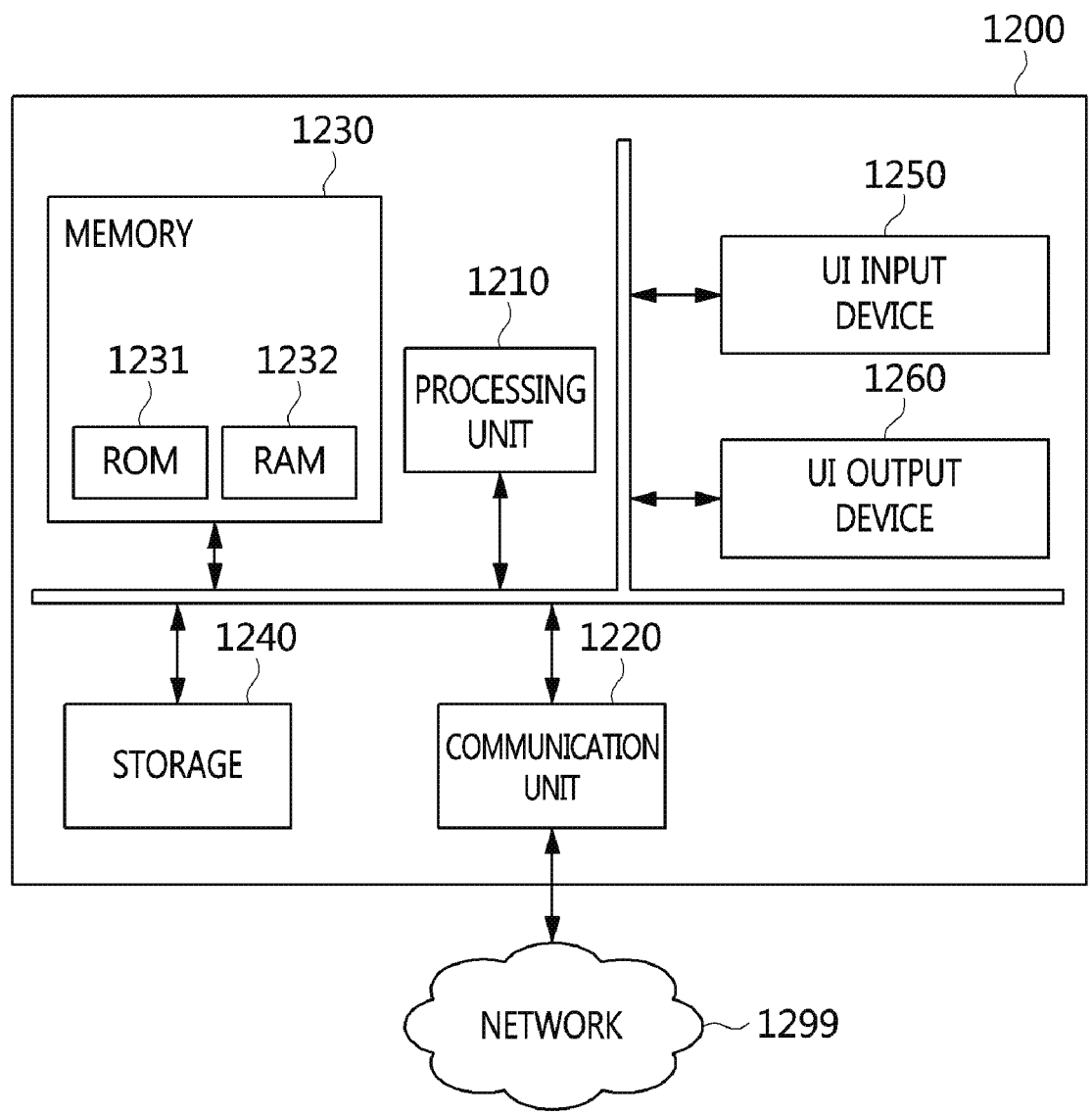
FIG. 12 is a configuration diagram of an encoding apparatus according to an embodiment.

FIG. 12 is a configuration diagram of an encoding apparatus according to an embodiment.

An encoding apparatus 1200 may include a processing unit 1210, memory 1230, a user interface (UI) input device 1250, a UI output device 1260, and storage 1240, which communicate with each other through a bus 1290. The encoding apparatus 1200 may further include a communication unit 1220 coupled to a network 1299.

The processing unit 1210 may be a Central Processing Unit (CPU) or a semiconductor device for executing processing instructions stored in the memory 1230 or the storage 1240. The processing unit 1210 may be at least one hardware processor.

The processing unit 1210 may generate and process signals, data or information that are input to the encoding apparatus 1200, are output from the encoding apparatus 1200, or are used in the encoding apparatus 1200, and may perform examination, comparison, determination, etc. related to the signals, data or information. In other words, in embodiments, the generation and processing of data or information and examination, comparison and determination related to data or information may be performed by the processing unit 1210.

At least some of the components constituting the processing unit 1210 may be program modules, and may communicate with an external device or system. The program modules may be included in the encoding apparatus 1200 in the form of an operating system, an application module, and other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1200.

The processing unit 1210 may correspond to the above-described encoder 800.

The term "storage unit" may denote the memory 1230 and/or the storage 1240. Each of the memory 1230 and the storage 1240 may be any of various types of volatile or nonvolatile storage media. For example, the memory 1230 may include at least one of Read-Only Memory (ROM) 1231 and Random Access Memory (RAM) 1232.

The storage unit may store data or information used for the operation of the encoding apparatus 1200. In an embodiment, the data or information of the encoding apparatus 1200 may be stored in the storage unit.

The encoding apparatus 1200 may be implemented in a computer system including a computer-readable storage medium.

The storage medium may store at least one module required for the operation of the encoding apparatus 1200. The memory 1230 may store at least one module, and may be configured such that the at least one module is executed by the processing unit 1210.

Functions related to communication of the data or information of the encoding apparatus 1200 may be performed through the communication unit 1220.

The network 1299 may provide communication between the encoding apparatus 1200 and a decoding apparatus 1300.

Figure 13:
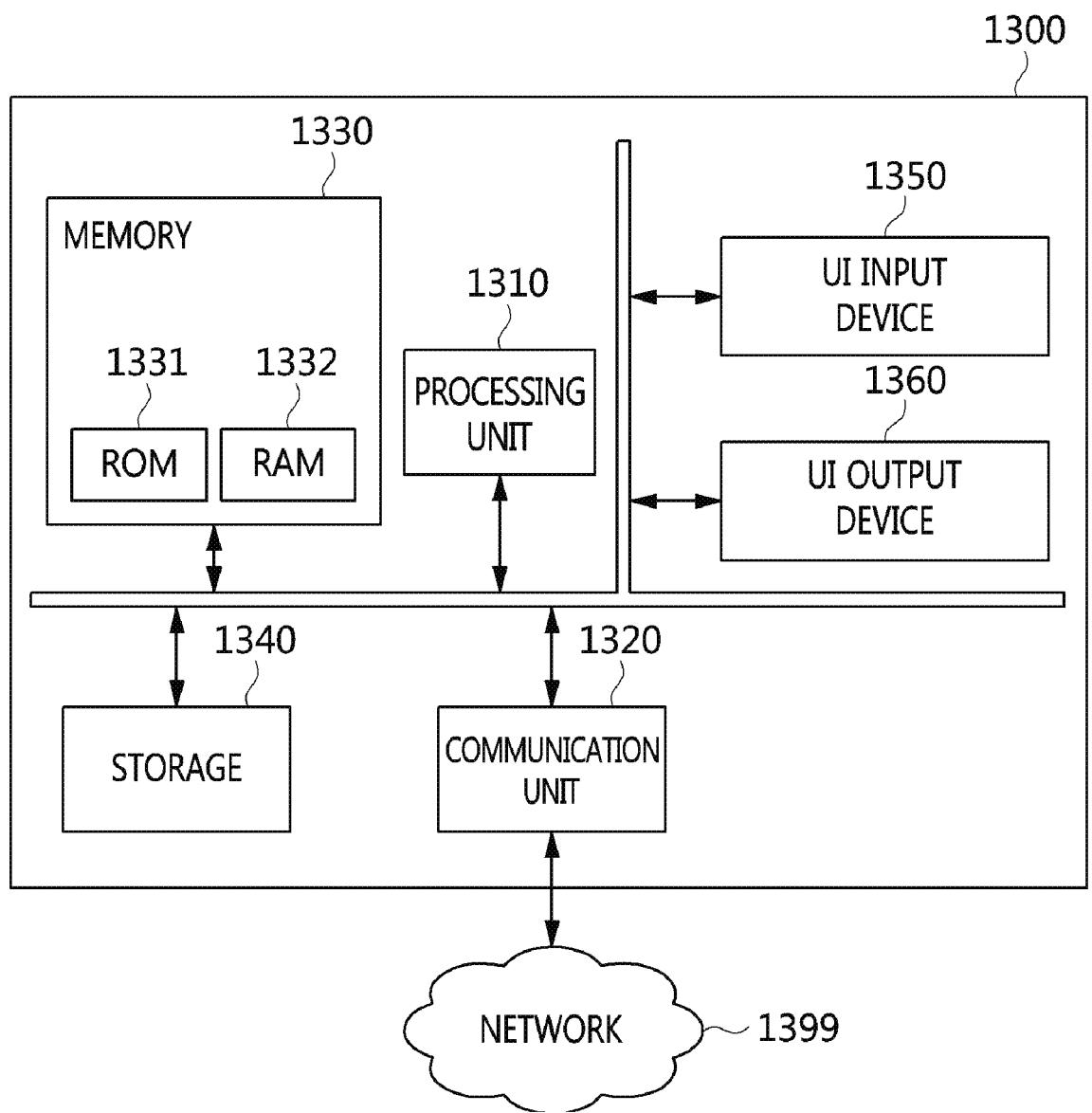
FIG. 13 is a configuration diagram of a decoding apparatus according to an embodiment.

FIG. 13 is a configuration diagram of a decoding apparatus according to an embodiment.

A decoding apparatus 1300 may include a processing unit 1310, memory 1330, a user interface (UI) input device 1350, a UI output device 1360, and storage 1340, which communicate with each other through a bus 1390. The decoding apparatus 1300 may further include a communication unit 1320 coupled to a network 1399.

The processing unit 1310 may be a CPU or a semiconductor device for executing processing instructions stored in the memory 1330 or the storage 1340. The processing unit 1310 may be at least one hardware processor.

The processing unit 1310 may generate and process signals, data or information that are input to the decoding apparatus 1300, are output from the decoding apparatus 1300, or are used in the decoding apparatus 1300, and may perform examination, comparison, determination, etc. related to the signals, data or information. In other words, in embodiments, the generation and processing of data or information and examination, comparison and determination related to data or information may be performed by the processing unit 1310.

At least some of the components constituting the processing unit 1310 may be program modules, and may communicate with an external device or system. The program modules may be included in the decoding apparatus 1300 in the form of an operating system, an application module, and other program modules.

The program modules may be physically stored in various types of well-known storage devices. Further, at least some of the program modules may also be stored in a remote storage device that is capable of communicating with the decoding apparatus 1300.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1300.

The processing unit 1310 may correspond to the above-described decoder 900.

The term "storage unit" may denote the memory 1330 and/or the storage 1340. Each of the memory 1330 and the storage 1340 may be any of various types of volatile or nonvolatile storage media. For example, the memory 1330 may include at least one of Read-Only Memory (ROM) 1331 and Random Access Memory (RAM) 1332.

The storage unit may store data or information used for the operation of the decoding apparatus 1300. In an embodiment, the data or information of the decoding apparatus 1300 may be stored in the storage unit.

The decoding apparatus 1300 may be implemented in a computer system including a computer-readable storage medium.

The storage medium may store at least one module required for the operation of the decoding apparatus 1300. The memory 1330 may store at least one module, and may be configured such that the at least one module is executed by the processing unit 1310.

Functions related to communication of the data or information of the decoding apparatus 1300 may be performed through the communication unit 1320.

The network 1399 may provide communication between the encoding apparatus 1200 and a decoding apparatus 1300.

Figure 14:
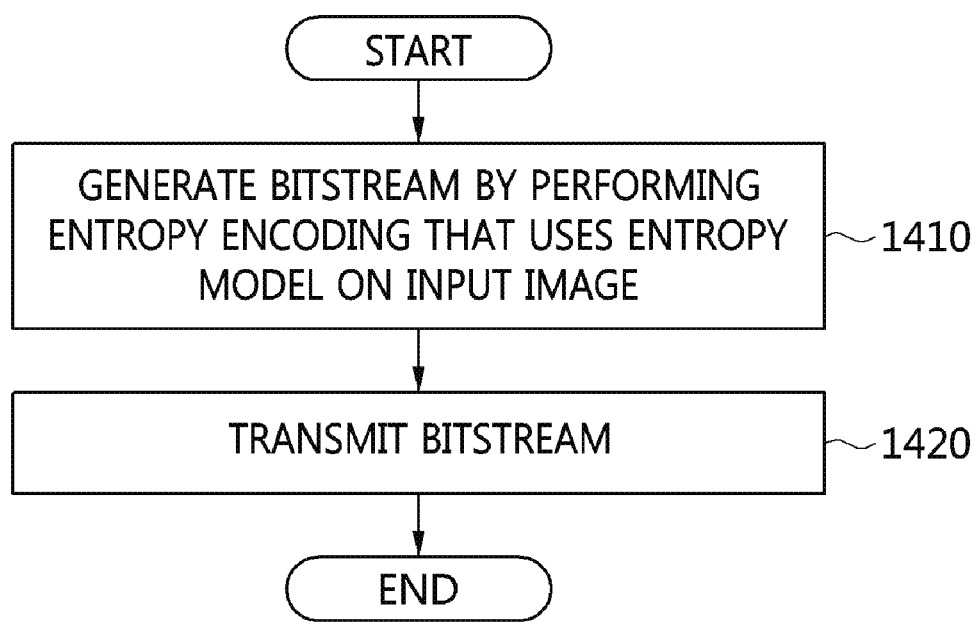
FIG. 14 is a flowchart of an encoding method according to an embodiment.

FIG. 14 is a flowchart of an encoding method according to an embodiment.

At step 1410, the processing unit 1210 of the encoding apparatus 1200 may generate a bitstream.

The processing unit 1210 may generate the bitstream by performing entropy encoding that uses an entropy model on an input image.

The entropy model may correspond to the above-described context-adaptive entropy model. The context-adaptive entropy model may exploit multiple different types of contexts. The multiple different types of contexts may include a bit-consuming context and a bit-free context.

From the multiple different types of contexts, a standard deviation parameter and a mean (mu) parameter of the entropy model may be estimated. That is, the entropy model may be based on a Gaussian model having the mu parameter.

Alternatively, the entropy model may include multiple types of entropy models. For example, the entropy model may include a context-adaptive entropy model and a light-weight entropy model.

At step 1420, the communication unit 1220 of the encoding apparatus 1200 may transmit the bitstream. The communication unit 1220 may transmit the bitstream to the decoding apparatus 1300. Alternatively, the bitstream may be stored in the storage unit of the encoding apparatus 1200.

Descriptions related to the image entropy encoding and the entropy engine described in connection with the above-described embodiment may also be applied to the present embodiment. Repeated descriptions thereof are thus omitted.

Figure 15:
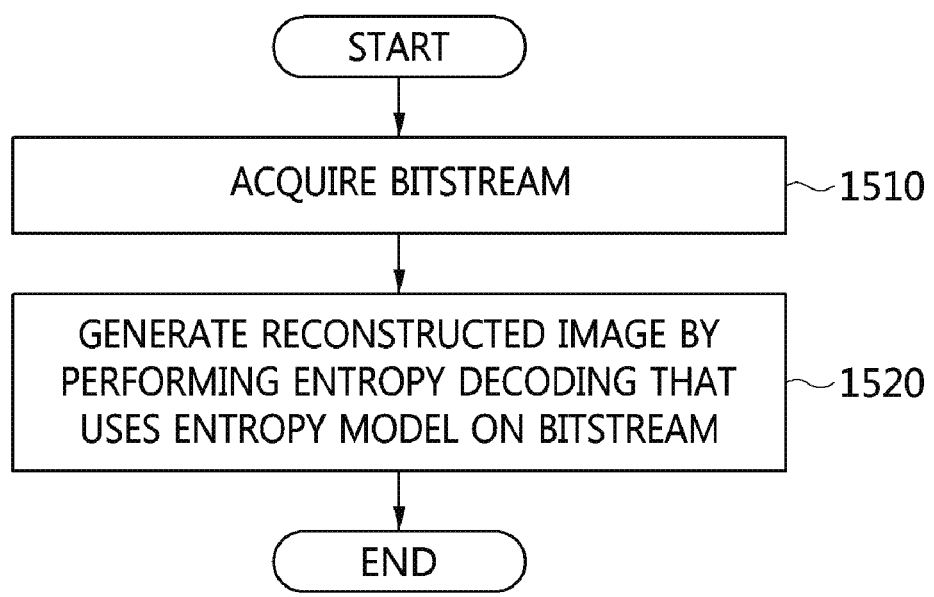
FIG. 15 is a flowchart of a decoding method according to an embodiment.

FIG. 15 is a flowchart of a decoding method according to an embodiment.

At step 1510, the communication unit 1320 of the decoding apparatus 1300 may acquire a bitstream.

At step 1520, the processing unit 1310 of the decoding apparatus 1300 may generate a reconstructed image using the bitstream.

The processing unit 1310 of the decoding apparatus 1300 may generate the reconstructed image by performing entropy decoding that uses an entropy model on the bitstream.

The entropy model may correspond to the above-described context-adaptive entropy model. The context-adaptive entropy model may exploit multiple different types of contexts. The multiple different types of contexts may include a bit-consuming context and a bit-free context.

From the multiple different types of contexts, a standard deviation parameter and a mean (mu) parameter of the entropy model may be estimated. That is, the entropy model may be based on a Gaussian model having the mu parameter.

Alternatively, the entropy model may include multiple types of entropy models. For example, the entropy model may include a context-adaptive entropy model and a light-weight entropy model.

Descriptions related to the image entropy decoding and entropy engine described in connection with the above-described embodiment may also be applied to the present embodiment. Repeated descriptions thereof are thus omitted.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

There are provided an Artificial Neural Network (ANN)-based encoding apparatus and method and decoding apparatus and method, which exhibit better performance than traditional image codecs.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. An encoding method, comprising:
    generating a bitstream by performing entropy encoding that uses an entropy model shared with a decoder on an input image; and
    transmitting or storing the bitstream,
    wherein the input image is transformed into a latent representation using a convolution neural network
    wherein the entropy model performs a context-adaptive entropy coding by estimating a probability of the latent representation,
    wherein a quantized latent representation is generated by quantizing the latent representation,
    wherein an entropy-encoded latent representation is generated by performing entropy encoding which uses the entropy model on the quantized latent representation, and
    wherein the entropy-encoded latent representation is outputted as the bitstream, wherein the latent representation comprises a first latent representation and a second latent representation, wherein the input image is transformed into the first latent representation by a first analysis transform, wherein a first quantized latent representation is generated by quantizing the first latent representation, wherein spatial redundancies of the first quantized latent representation captured into the second latent representation by a second analysis transform, and wherein contexts for model estimation are generated by a second synthesis transform and extracted from a known subset of the first latent representation.

2. The encoding method of claim 1, wherein the entropy model is a context-adaptive entropy model, wherein the context-adaptive entropy model exploits multiple different types of the contexts, and wherein the trained entropy model estimates a distributing of the latent representation using the contexts.

3. The encoding method of claim 2, wherein the multiple different types of the contexts comprise a bit-consuming context and a bit-free context.

4. The encoding method of claim 3, wherein a standard deviation parameter and a mean parameter of the entropy model are estimated from the multiple different types of the contexts to reduce spatial dependency of the latent representation.

5. The encoding method of claim 2, wherein an input to an analysis transform of the context-adaptive entropy model includes uniformly quantized representations.

6. The encoding method of claim 1, wherein the entropy model is based on a Gaussian model having a mean parameter.

7. The encoding method of claim 1, wherein the entropy model comprises a context-adaptive entropy model and a lightweight entropy model, and wherein the latent representation is a three-dimensional array.

8. The encoding method of claim 7, wherein the latent representation is split into a first part latent representation and a second part latent representation in a channel-wise manner, wherein the first part latent representation is quantized into a first quantized part latent representation, wherein the second part latent representation is quantized into a second quantized part latent representation, wherein the first quantized part latent representation is encoded using the context-adaptive entropy model used to estimate a distribution of the first part latent representation, and wherein the second quantized part latent representation is encoded using the lightweight entropy model used to estimate a distribution of the second part latent representation.

9. The encoding method of claim 7, wherein the lightweight entropy model exploits scale estimation.

10. The encoding method of claim 7, wherein the lightweight entropy model retrieves standard deviations directly estimated from an analysis transform.

11. A decoding method, comprising:

acquiring a bitstream; and generating a reconstructed image by performing decoding that uses an entropy model shared with an encoder on an entropy-encoded latent representation in the bitstream, wherein the reconstructed image is generated using a convolution neural network, wherein a latent representation is generated by performing entropy decoding which uses the entropy model on the entropy-encoded latent representation, wherein the reconstructed image is generated using the latent representation, wherein the entropy model performs a context-adaptive entropy coding by estimating a probability of the latent representation, wherein the latent representation comprises a first latent representation and a second latent representation, wherein the reconstructed image is generated using the first latent representation by a synthesis transform, wherein the first latent representation is generated using the entropy model based on a Gaussian model having a standard deviation parameter and a mean parameter, wherein the standard deviation parameter and the mean parameter is estimated from a first type and a second type of contexts based on a distribution estimator, wherein a known subset of the first latent representation is used to generate the first type of the contexts to estimate a distribution for the first latent representation, and wherein the second latent representation is used to generate the second type of the contexts to estimate the distribution for the first latent representation.

12. The decoding method of claim 11, wherein the entropy model is a context-adaptive entropy model, wherein the context-adaptive entropy model exploits multiple different types of the contexts, and wherein the entropy model estimates a distributing of the latent representation using the contexts.

13. The decoding method of claim 12, wherein the multiple different types of the contexts comprise a bit-consuming context and a bit-free context to reduce spatial dependency of the latent representation.

14. The decoding method of claim 12, wherein an input to an analysis transform of the context-adaptive entropy model includes uniformly quantized representations.

15. The decoding method of claim 11, wherein the entropy model comprises a context-adaptive entropy model and a lightweight entropy model, and, wherein the latent representation is a three-dimensional array.

16. The decoding method of claim 15, wherein the lightweight entropy model exploits scale estimation.

17. The decoding method of claim 15, wherein the lightweight entropy model retrieves standard deviations directly estimated from an analysis transform.

18. A non-transitory computer-readable storage medium storing a bitstream for a video decoding including a computer-executable code, when executed, causing a video decoding apparatus to perform the following steps:

generating a reconstructed image by performing decoding that uses an entropy model shared with an encoder on an entropy-encoded latent representation in the bitstream, wherein the reconstructed image is generated using a convolution neural network, a latent representation is generated by performing entropy decoding which uses the entropy model on the entropy-encoded latent representation, the reconstructed image is generated using the latent representation, the entropy model performs a context-adaptive entropy coding by estimating a probability of the latent representation, the latent representation comprises a first latent representation and a second latent representation, the reconstructed image is generated using the first latent representation by a synthesis transform, the first latent representation is generated using the entropy model based on a Gaussian model having a standard deviation parameter and a mean parameter, the standard deviation parameter and the mean parameter is estimated from a first type and a second type of contexts based on a distribution estimator, a known subset of the first latent representation is used to generate the first type of the contexts to estimate a distribution for the first latent representation, and the second latent representation is used to generate the second type of the contexts to estimate the distribution for the first latent representation.

\* \* \* \* \*